(12) United States Patent
Noh et al.

(10) Patent No.: US 12,316,571 B2
(45) Date of Patent: May 27, 2025

(54) METHOD AND APPARATUS FOR SUPPORTING MULTIPLE USER CASCADING SEQUENCE INCLUDING A-PPDU IN A WIRELESS COMMUNICATION SYSTEM

(71) Applicant: Senscomm Semiconductor Co., Ltd., Suzhou (CN)

(72) Inventors: Yujin Noh, Irvine, CA (US); Seung Hyeok Ahn, Irvine, CA (US); Seung Ho Choo, Suzhou (CN); Young-Hwan Kang, Pyeongtaek-si (KR); Jungchul Shin, Seoul (KR); Tan Joong Park, Seoul (KR); Daehong Kim, Irvine, CA (US)

(73) Assignee: Senscomm Semiconductor Co., Ltd., Suzhou (CN)

( * ) Notice: Subject to any disclaimer, the term of this patent is extended or adjusted under 35 U.S.C. 154(b) by 233 days.

(21) Appl. No.: 17/880,238

(22) Filed: Aug. 3, 2022

(65) Prior Publication Data
US 2023/0061723 A1 Mar. 2, 2023

Related U.S. Application Data

(60) Provisional application No. 63/365,399, filed on May 26, 2022, provisional application No. 63/229,481, filed on Aug. 4, 2021.

(51) Int. Cl.
*H04L 5/00* (2006.01)
*H04L 27/26* (2006.01)
*H04W 72/0446* (2023.01)

(52) U.S. Cl.
CPC ........ *H04L 5/0053* (2013.01); *H04L 27/2692* (2013.01); *H04W 72/0446* (2013.01)

(58) Field of Classification Search
CPC ............. H04L 5/0053; H04L 27/2692; H04W 72/0446
See application file for complete search history.

(56) References Cited

U.S. PATENT DOCUMENTS 11,627,496 B2 * 4/2023 Chun .................... H04W 72/23
370/230

FOREIGN PATENT DOCUMENTS

| KR | 10-2017-0042370 A | 4/2017 |
| KR | 10-2017-0117445 A | 10/2017 |
| WO | 2019/161189 A1 | 8/2019 |

OTHER PUBLICATIONS

Office Action for KR 10-2022-0097269 by Korean Intellectual Property Office dated Mar. 7, 2025.

* cited by examiner

*Primary Examiner* — Yemane Mesfin
*Assistant Examiner* — Jia Hao Deng
(74) *Attorney, Agent, or Firm* — BROADVIEW IP LAW, PC

(57) ABSTRACT

A method performed by an apparatus in a wireless local area network (WLAN) is provided. The method comprises: transmitting a first physical layer convergence protocol (PLCP) protocol data unit (PPDU) for a first variant including a first control field and a second PPDU for a second variant including a second control field in A(aggregated)-PPDU, wherein the second PPDU for the second variant is transmitted in duplicate (DUP) mode; and receiving a first response to the first PPDU and a second response to the second PPDU in A-PPDU based on the first control field and the second control field, respectively, wherein the first variant is based on a first protocol standard and the second variant is based on a second protocol standard, and wherein the second protocol standard is beyond version of the first protocol standard.

18 Claims, 17 Drawing Sheets

(a)

(b)

(a)

(b)

(c)

(a)

(b)

(a)

(b)

A-Control subfield format

Control subfield format

METHOD AND APPARATUS FOR SUPPORTING MULTIPLE USER CASCADING SEQUENCE INCLUDING A-PPDU IN A WIRELESS COMMUNICATION SYSTEM

CROSS-REFERENCE TO PRIOR APPLICATIONS

This application claims priority under 35 U.S.C. § 119 to U.S. Provisional Patent Application Nos. 63/229,481 (filed Aug. 4, 2021) and 63/365,399 (filed May 26, 2022), which are alle hereby incorporated by reference in its entirety.

BACKGROUND

The present disclosure relates to a method and apparatus for supporting multiple user cascading sequence including A-PPDU in a wireless communication system.

Wi-Fi is a Wireless Local Area Network (WLAN) technology that allows devices to access the Internet in the different frequency bands such as 2.4 GHz, 5 GHz, 6 GHz or 60 GHz frequency bands.

WLANs are based on the Institute of Electrical and Electronic Engineers (IEEE) 802.11 standard. The Wireless Next Generation Standing Committee (WNG SC) of IEEE 802.11 is an ad hoc committee that considers the next generation WLAN in the medium to long term.

The legacy IEEE 802.11a/b/g/n/ac does not guarantee communication stability in dense environments with many users. In order to overcome this limit, the IEEE 802.11ax as the WLAN system supporting High Efficiency (HE) has been developed. The IEEE 802.11ax aims to improve system throughput in dense environments.

Recently, there is a need for a new WLAN system to support maximum data throughput than the data throughput supported by IEEE 802.11ax.

IEEE 802.11be also known as Extremely High Throughput (EHT) WLAN is built upon 802.11ax, focusing on extremely high speed and extremely low latency for the wireless communication service such as 4k and 8k video streaming, virtual reality/augmented reality (VR/AR), etc.

The scope of IEEE 802.11be, often discussed in the next-generation WLAN task group, also known as IEEE 802.11be or Extremely High Throughput (EHT) WLAN, includes: 1) 320 MHz bandwidth and more efficient utilization of non-contiguous spectrum, 2) multiple RU (MRU) operation 3) Multi-band/multi-channel aggregation and operation (also referred to as multiple link operation (MLO)), 4) 16 spatial streams and Multiple Input Multiple Output (MIMO) protocols enhancements, 5) Multi-Access Point (AP) Coordination (e.g. coordinated and joint transmission), 6) Enhanced link adaptation and retransmission protocol (e.g. Hybrid Automatic Repeat Request (HARD)), 7) if needed, adaptation to regulatory rules specific to 6 GHz spectrum, 8) Integrating Time-Sensitive Networking (TSN) extensions for low-latency real-time traffic (IEEE 802.11aa).

SUMMARY

According to an embodiment of the present disclosure, there is provided a method performed by an apparatus in a wireless local area network (WLAN). The method comprises: transmitting a first physical layer convergence protocol (PLCP) protocol data unit (PPDU) for a first variant including a first control field and a second PPDU for a second variant including a second control field in A(aggregated)-PPDU, wherein the second PPDU for the second variant is transmitted in duplicate (DUP) mode; and receiving a first response to the first PPDU and a second response to the second PPDU in A-PPDU based on the first control field and the second control field, respectively, wherein the first variant is based on a first protocol standard and the second variant is based on a second protocol standard, and wherein the second protocol standard is beyond version of the first protocol standard.

In addition, according to an embodiment of the present disclosure, there is provided a method performed by an apparatus in a wireless local area network (WLAN). The method comprises: receiving a first physical layer convergence protocol (PLCP) protocol data unit (PPDU) for a first variant including a first control field and a second PPDU for a second variant including a second control field in A(aggregated)-PPDU, wherein the second PPDU for the second variant is transmitted in duplicate (DUP) mode; and transmitting a first response to the first PPDU and a second response to the second PPDU in A-PPDU based on the first control field and the second control field, respectively, wherein the first variant is based on a first protocol standard and the second variant is based on a second protocol standard, and wherein the second protocol standard is beyond version of the first protocol standard.

In addition, according to an embodiment of the present disclosure, an apparatus in a WLAN is provided. The apparatus comprising: a transceiver; and a processor configured to: control the transceiver to transmit a first physical layer convergence protocol (PLCP) protocol data unit (PPDU) for a first variant including a first control field and a second PPDU for a second variant including a second control field in A(aggregated)-PPDU, wherein the second PPDU for the second variant is transmitted in duplicate (DUP) mode; and control the transceiver to receive a first response to the first PPDU and a second response to the second PPDU in A-PPDU based on the first control field and the second control field, wherein the first variant is based on a first protocol standard and the second variant is based on a second protocol standard, and wherein the second protocol standard is beyond version of the first protocol standard.

In addition, according to an embodiment of the present disclosure, an apparatus in a WLAN is provided. The apparatus comprising: a transceiver; and a processor configured to: control the transceiver to receive a first physical layer convergence protocol (PLCP) protocol data unit (PPDU) for a first variant including a first control field and a second PPDU for a second variant including a second control field in A(aggregated)-PPDU, wherein the second PPDU for the second variant is transmitted in duplicate (DUP) mode; and control the transceiver to transmit a first response to the first PPDU and a second response to the second PPDU in A-PPDU based on the first control field and the second control field, wherein the first variant is based on a first protocol standard and the second variant is based on a second protocol standard, and wherein the second protocol standard is beyond version of the first protocol standard.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
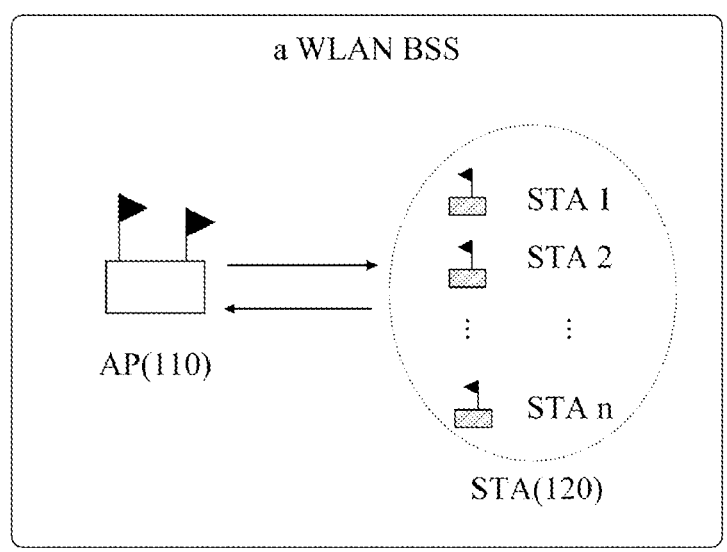
FIG. 1 illustrates an example BSS in a WLAN according to an embodiment of the present disclosure.

The following detailed description of the embodiments of the present disclosure is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the present disclosure, reference is made to the accompanying drawings that form a part hereof, and in which are shown by way of illustration embodiments of the present disclosure in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The following detailed description of the embodiments of the present disclosure applies to a wireless local area network (WLAN). The following description may apply to the next generation WLAN method (IEEE 802.11be) or the like. The IEEE 802.11be maintains compatibility with the conventional IEEE 802.11a/b/g/n/ac/ax (Hereinafter referred to as "11a/b/g/n/ac/ax"). The following description may be executed in the IEEE 802.11be (Hereinafter referred to as "11be") environment, and also maintains compatibility with the conventional 11a/b/g/n/ac/ax.

In a WLAN, a single basic service set (BSS) is composed of two kinds of entity which are a single AP Station (STA) and a plurality of non-AP STAs. STAs share a same radio frequency channel with one out of WLAN operation bandwidth options (e.g., 20/40/80/160/320 MHz). Here, AP STA and non-AP STA could be referred as AP and STA, respectively.

WLAN has included operation of multiple users' frame transmissions and receptions simultaneously wherein frame exchanges are scheduled under the specific rule within a BSS. Here multi-user (MU) transmission means that the frames in a certain BSS are transmitted to (e.g., downlink (DL) MU) or from (e.g., uplink (UL) MU) a plurality of STAs simultaneously based on different resources. For example, different resources could be different frequency resources in orthogonal frequency division multiplexing access (OFDMA) transmission or different spatial streams in multi MU-multiple input multiple output (MIMO) transmission with DL-OFDMA, DL-MU-MIMO, UL-OFDMA, and UL-MU-MIMO of MU transmission as shown in FIG. 1.

FIG. 1 illustrates an example BSS in a WLAN according to an embodiment of the present disclosure.

Referring to FIG. 1, a WLAN BSS 100 may include a one AP 110 and a plurality of STAs 120. Any one of the plurality of STAs 120 may receive resource allocated for MU transmission and communicate with the AP 110. The AP 110 may deliver information regarding the resource allocation for MU transmission to any one of the plurality of STAs 120. The plurality of STAs 120 may receive/transmit, from/to the AP 110, the frames simultaneously in the WLAN BSS 100 based on the allocated resources for MU transmission.

Figure 2A:
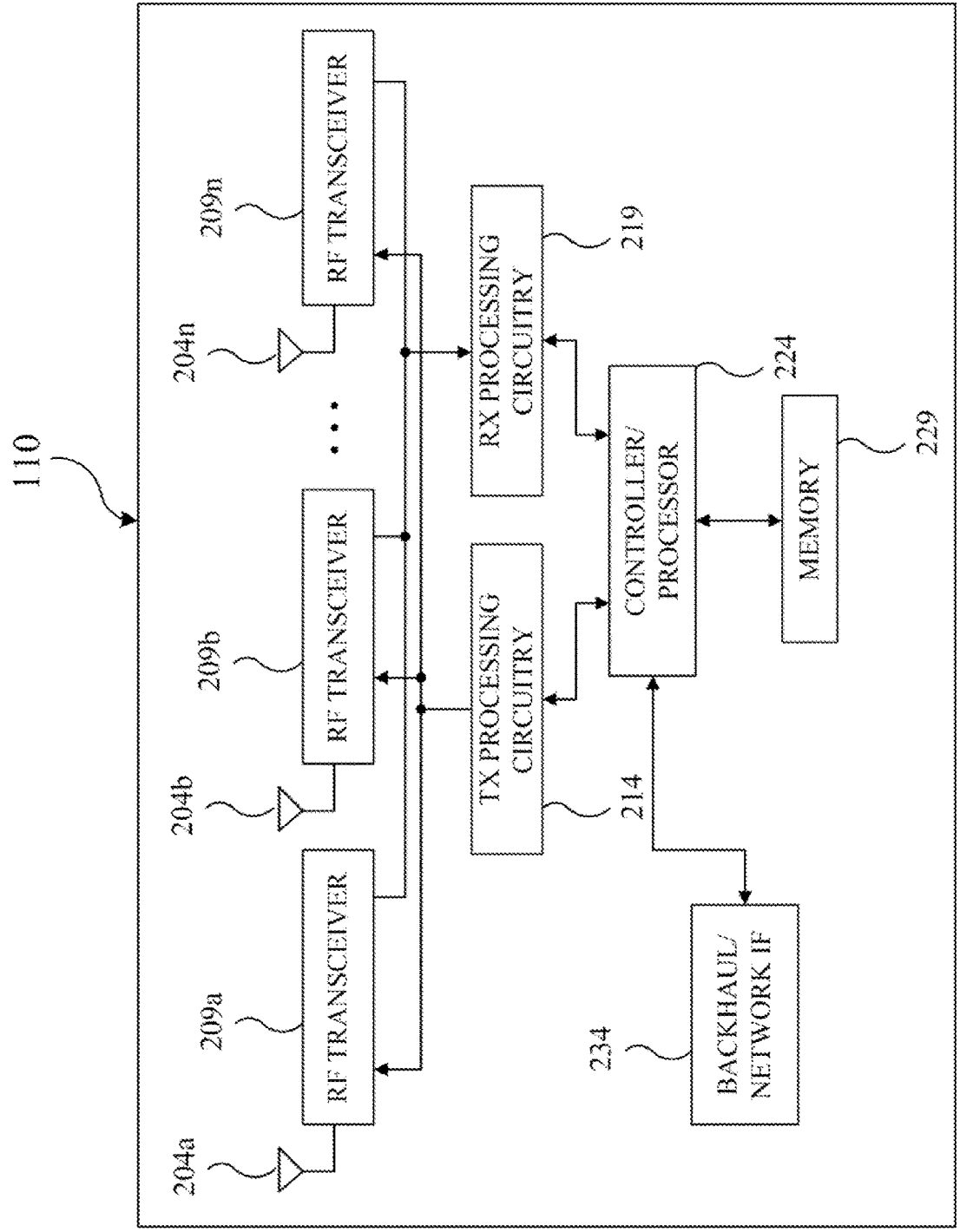
FIG. 2A illustrates an example AP 110 according to an embodiment of the present disclosure.

FIG. 2A illustrates an example AP 110 according to an embodiment of the present disclosure. The embodiment of the AP 110 illustrated in FIG. 2A is for illustration only, and the AP 110 of FIG. 1 could have the same or similar configuration. However, APs come in a wide variety of configurations, and FIG. 2A does not limit the scope of the present disclosure to any particular implementation of an AP.

As shown in FIG. 2A, the AP 110 includes multiple antennas 204 $a$-204 $n$, multiple RF transceivers 209 $a$-209 $n$, transmit (TX) processing circuitry 214, and receive (RX) processing circuitry 219. The AP 110 also includes a controller/processor 224, a memory 229, and a backhaul or network interface 234.

The RF transceivers 209 $a$-209 $n$ receive, from the antennas 204 $a$-204 $n$, incoming RF signals, such as signals transmitted by STAs in the WLAN BSS 100. The RF transceivers 209 $a$-209 $n$ down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209 $a$-209 $n$ receive the outgoing processed baseband or IF signals from the TX processing circuitry 214 and up-converts the baseband or IF signals to RF signals that are transmitted via the antennas 204 $a$-204 $n$.

The controller/processor 224 can include one or more processors or other processing devices that control the overall operation of the AP 110. For example, the controller/processor 224 could control the reception of forward channel signals and the transmission of reverse channel signals by the RF transceivers 209 $a$-209 $n$, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204 $a$-204 $n$ are weighted differently to effectively steer the outgoing signals in a desired direction. The controller/processor 224 could also support OFDMA operations in which outgoing signals are assigned to different subsets of subcarriers for different recipients (e.g., different STAs). Any of a wide variety of other functions could be supported in the AP 110 by the controller/processor 224 including a combination of DL MU-MIMO and OFDMA in the same transmit opportunity. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 110 to communicate with other devices or systems over a backhaul connection or over a network. The interface 234 could support communications over any suitable wired or wireless connection(s). For example, the interface 234 could allow the AP 110 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 110 may include circuitry and/or programming for management of channel sounding procedures in WLANs. Although FIG. 2A illustrates one example of AP 101, various changes may be made to FIG. 2A. For example, the AP 110 could include any number of each component shown in FIG. 2A. As a particular example, an access point could include a number of interfaces 234, and the controller/processor 224 could support routing functions to route data between different network addresses. As another example, while shown as including a single instance of TX processing circuitry 214 and a single instance of RX processing circuitry 219, the AP 110 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
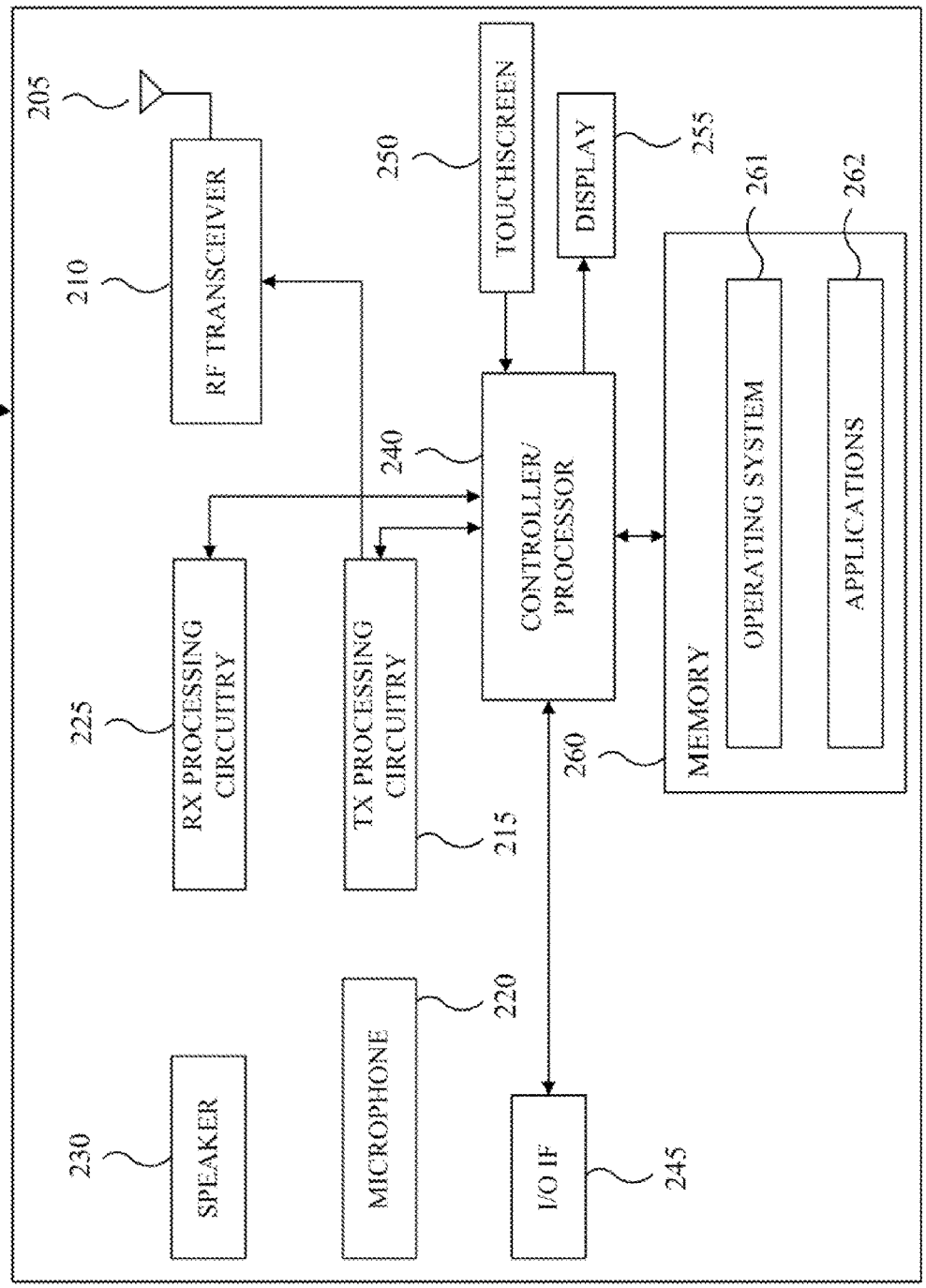
FIG. 2B illustrates an example STA 120 according to an embodiment of the present disclosure.

FIG. 2B illustrates an example STA 120 according to an embodiment of the present disclosure. The embodiment of the STA 120 illustrated in FIG. 2B is for illustration only, and the STAs 120 of FIG. 1 could have the same or similar configuration. However, STAs come in a wide variety of configurations, and FIG. 2B does not limit the scope of the present disclosure to any particular implementation of a STA.

As shown in FIG. 2B, the STA 120 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the WLAN BSS 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 120. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of channel sounding procedures in WLANs. In some embodiments, the controller/processor 240 includes at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet (NDP) Announcement frame and NDP frame and transmitting the beamforming feedback report in response to a Trigger frame. The controller/processor 240 can operate the plurality of applications 262 based on the OS program 261 or in response to a signal received from an AP. The main controller/processor 240 is also coupled to the I/O interface 245, which provides STA 120 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 120 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 120, various changes may be made to FIG. 2B. For example, various components in FIG. 2B could be combined, further subdivided, or omitted and additional components could be added according to particular needs. In particular examples, the STA 120 may include any number of antenna(s) 205 for MIMO communication with an AP 110. In another example, the STA 120 may not include voice communication or the controller/processor 240 could be divided into multiple processors, such as one or more central processing units (CPUs) and one or more graphics processing units (GPUs). Also, while FIG. 2B illustrates the STA 120 configured as a mobile telephone or smartphone, STAs could be configured to operate as other types of mobile or stationary devices.

Multi-user access modulation, for example, OFDMA for uplink and downlink has been introduced since High Efficiency (HE) WLAN, 11ax and after such future amendments such as extreme high throughput (EHT), and one or more STAs are allowed to use one or more resource units (RUs) throughout operation bandwidth and transmit at the same time. One RU is the minimum granularity which can be assigned and has decades of subcarriers in OFDM modulation symbol. Here, STAs could be associated or non-associated with AP when responding simultaneously in the assigned RUs within a specific period (e.g., SIFS, short inter frame space) as shown in FIG. 3 below.

Figure 3:
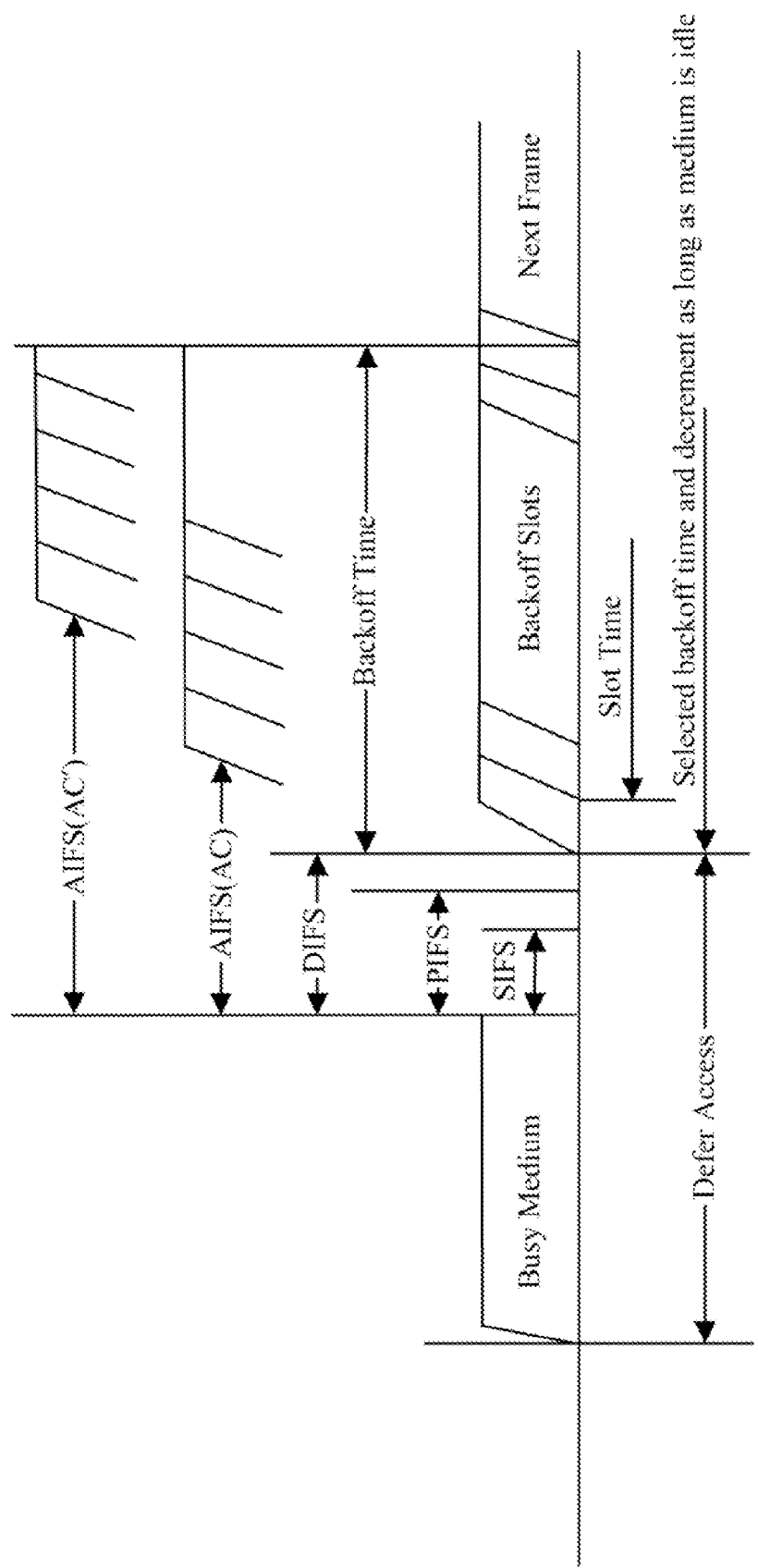
FIG. 3 illustrates different types of IFS in a WLAN according to an embodiment of the present disclosure.

FIG. 3 illustrates different types of IFS in a WLAN according to an embodiment of the present disclosure.

Referring to FIG. 3, inter frame space (IFS) is waiting periods between transmission of frames operating in the medium access control (MAC) sublayer where carrier-sense multi access/collision avoidance (CSMA/CA) is used. For example, IFS is the time period between completion of the transmission of the last frame and starting transmission of the next frame apart from the variable back-off period. The IEEE 802.11 standard defines various types of IFS such as short IFS (SIFS), point coordination function (PCF) IFS (PIFS), distributed coordination function (DCF) IFS (DIFS), and arbitration IFS (AIFS) to provide priority levels for access to wireless media. The relationship between the different IFS is illustrated in FIG. 3. SIFS is used for an acknowledgement (ACK) and for a ready to send (RTS) frame and clear to send (CTS) frame based high priority transmission. For example, if the control frame is a response frame of a previous frame, the WLAN device transmits the control frame without performing backoff if a SIFS has elapsed. PIFS is used in contention-free period (CFP) in PCF mode. For example, after the PIFS has elapsed, STAs having data to be transmitted in contention free period can be initiated. DIFS is used for contention-based services/applications. For example, using DCF mode, a STA needs to sense the status of the wireless channel before the STA can place its request to transmit a frame. AIFS is used by quality of service (QoS) STAs to transmit all data frames management frames (e.g., MAC management protocol data units (MMPDUs)) and control frames (e.g., power save-poll (PS-Poll), RTS, CTS).

OFDMA is an OFDM-based multiple access scheme where different subsets of subcarriers are allocated to different users, allowing simultaneous data transmission to or from one or more users with high accurate synchronization for frequency orthogonality.

Figure 4:
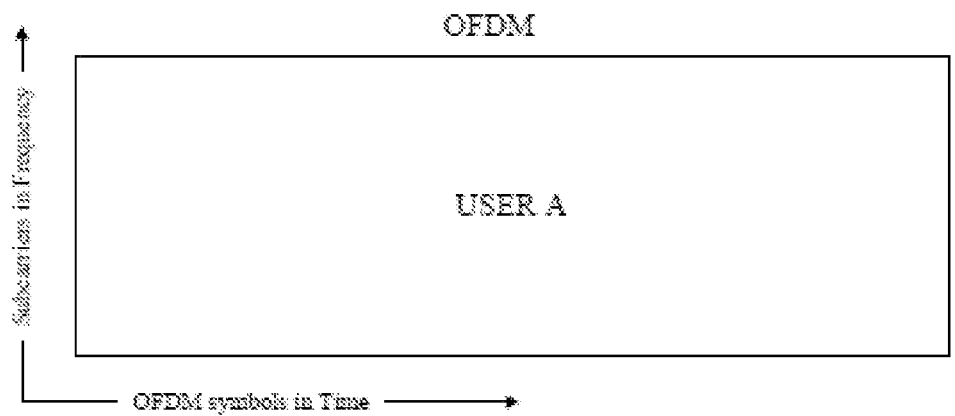
FIG. 4 illustrates a difference between OFDM and OFDMA according to an embodiment of the present disclosure.
Figure 4:
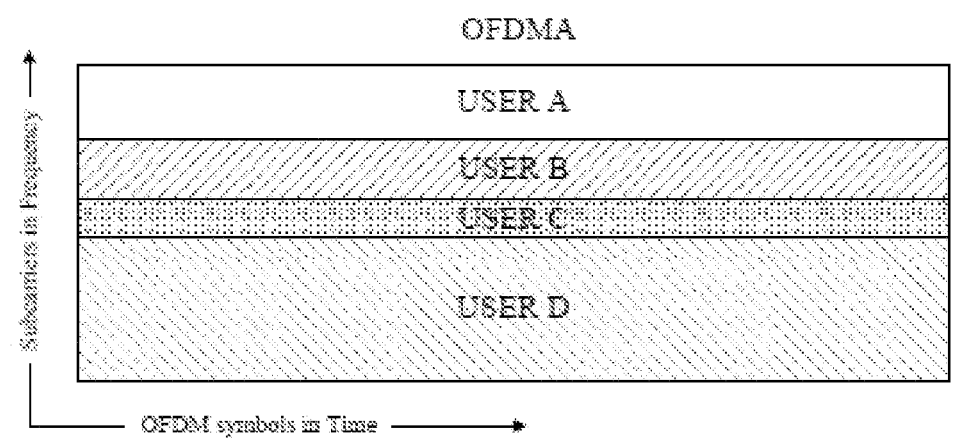

FIG. 4 illustrates difference between OFDM and OFDMA according to an embodiment of the present disclosure.

Referring to FIG. 4, in OFDM, a single user (e.g., USER A) is allocated whole subcarriers, while, in OFDMA, a plurality of users (e.g., USER A, USER B, USER C, and USER D) are allocated different subsets of subcarriers which can change from one physical layer convergence protocol (PLCP) protocol data unit (PPDU) to the next. In OFDMA, an OFDM symbol is constructed of subcarriers, the number of which is a function of the PPDU bandwidth.

In case of UL MU transmission, given different STAs with its own capabilities and features, AP may want to have more control mechanism of the medium by using more scheduled access, which may allow more frequent use of OFDMA/MU-MIMO transmissions. PPDUs in UL MU transmission (MU-MIMO or OFDMA) are sent as a response to the Trigger frame sent by the AP. Here, UL MU transmission consists of response frames (e.g., HE (or EHT) trigger-based (TB) PPDU) to a Trigger frame sent by the AP wherein the Trigger frame is supposed to have enough STA's information and assigned RUs. This allows specific STA to transmit the OFDMA based packet format with HE (or EHT) TB PPDU wherein HE (or EHT) TB PPDU is segmented into RU and all RUs as a response of Trigger frame are allocated to the selected non-AP STAs accordingly.

Figure 5:
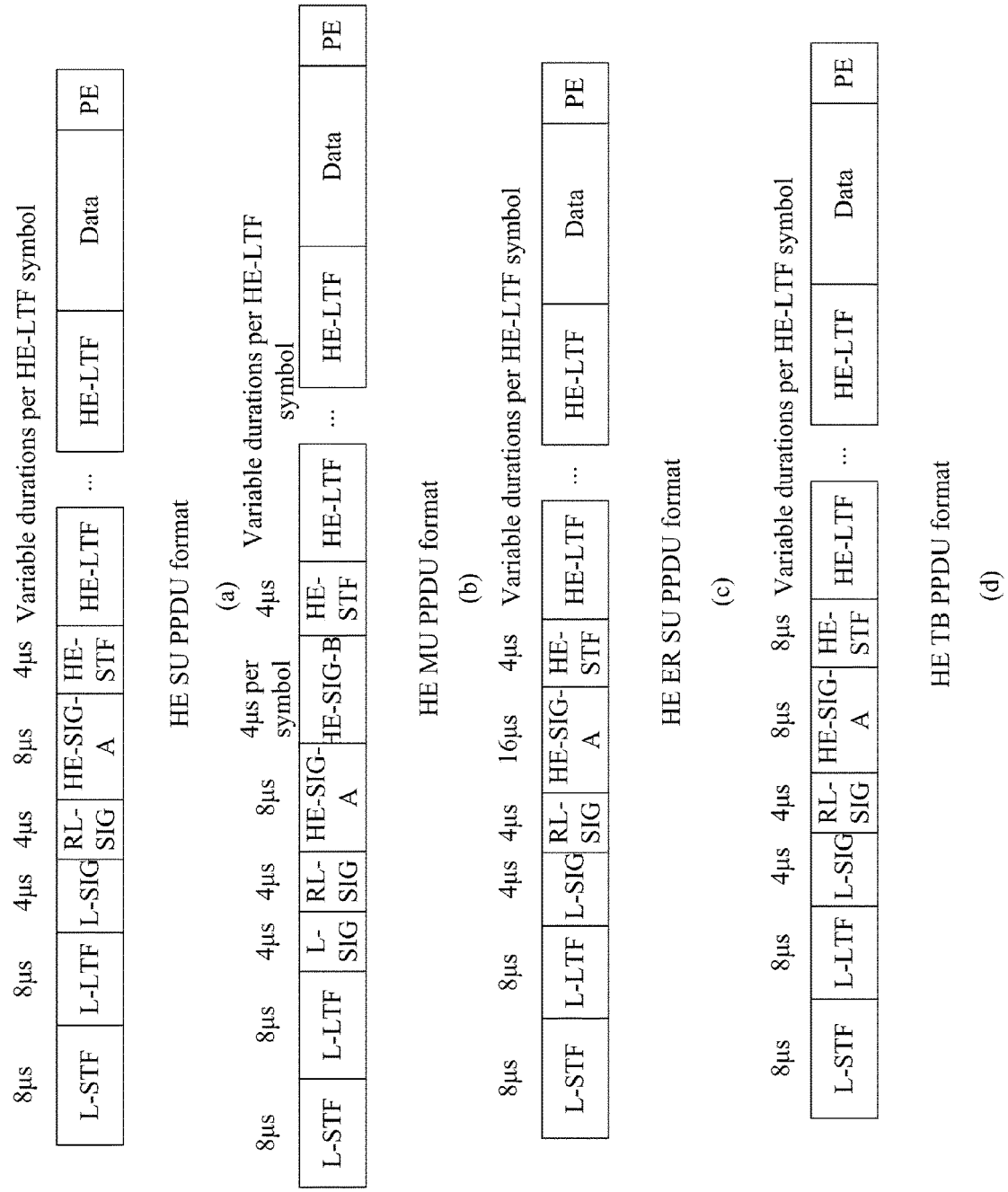
FIG. 5 illustrates an example of HE PPDU format according to an embodiment of the present disclosure.

FIG. 5 illustrates an example of HE PPDU format according to an embodiment of the present disclosure.

Referring to FIG. 5, in HE WLAN, the four HE PPDU formats are defined: HE SU PPDU for single user transmission ((a) of FIG. 5)), HE MU PPDU for multi-user transmission ((b) of FIG. 5)), HE ER SU PPDU for single user to cover extended coverage ((c) of FIG. 5)), and HE TB PPDU for UL multi-user transmission from STAs ((d) of FIG. 5)). The HE PHY supports a discrete Fourier transform (DFT) period of 3.2 µs and 12.8 µs for the pre-HE modulated fields and the HE modulated fields in an HE PPDU respectively. The HE PHY data subcarrier frequency spacing in a quarter of legacy very high throughput (VHT), HT PHY, which enables HE modulated OFDM symbol to have almost 4 multiples of data subcarriers. The fields of the HE PPDU formats are summarized in Table 1 and the L-STF, L-LTF, L-SIG, RL-SIG, HE-SIG-A, and HE-SIG-B fields are referred to as the Pre-HE modulated fields, while HE-STF, HE-LTF and Data fields are referred to as the HE modulated fields.

TABLE 1

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| HE-SIG-A | HE SIGNAL A field |
| HE-SIG-B | HE SIGNAL B field |
| HE-STF | HE Short Training field |
| HE-LTF | HE Long Training field |
| Data | The Data field carrying the PSDL(s) |
| PE | Packet extension field |

Figure 6:
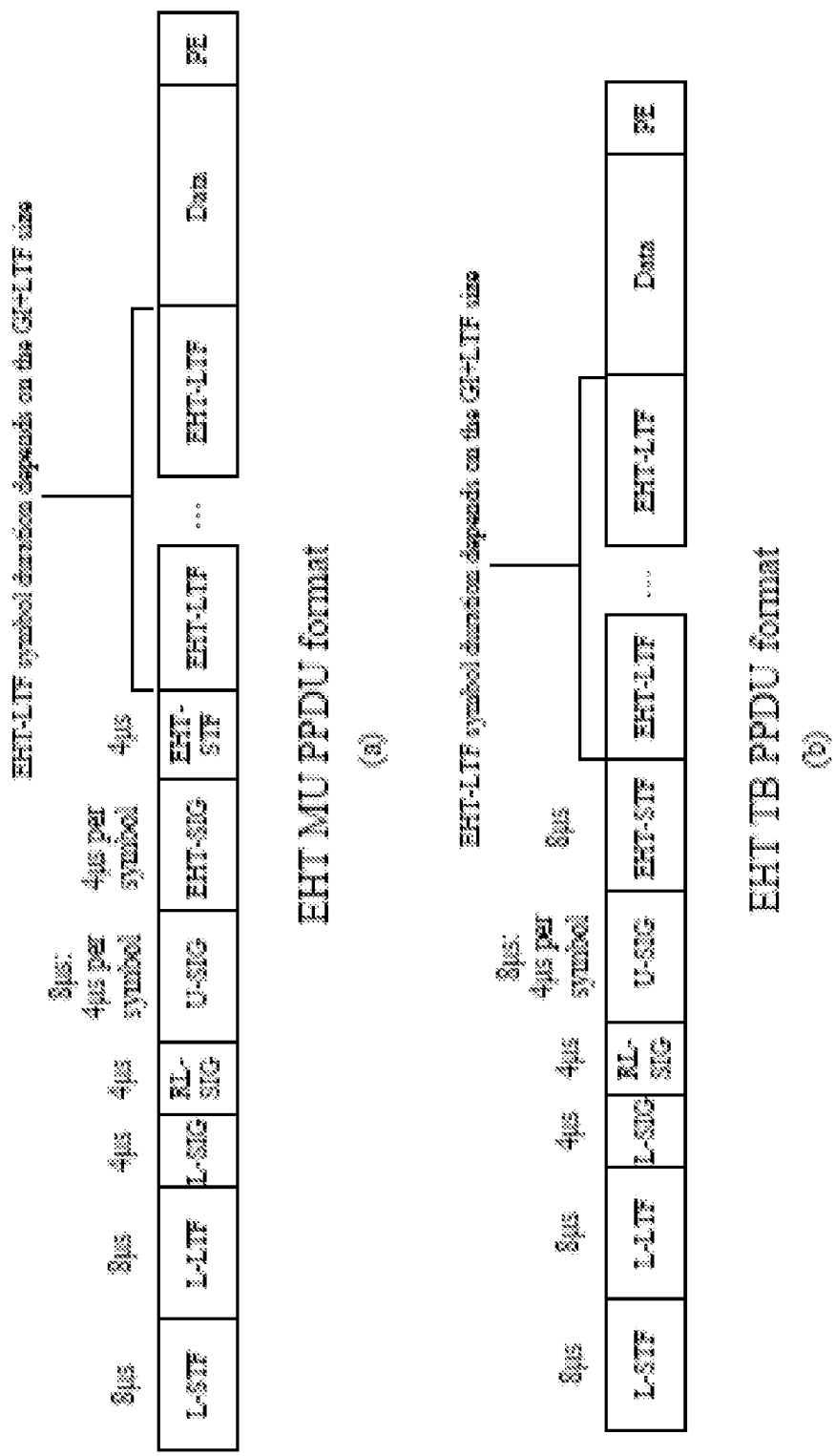
FIG. 6 illustrates an example of EHT PPDU format according to an embodiment of the present disclosure.

FIG. 6 illustrates an example of EHT PPDU format according to an embodiment of the present disclosure.

Referring to FIG. 6, in EHT, two EHT PPDU formats are defined: EHT MU PPDU ((a) of FIG. 6)) and EHT TB PPDU ((b) of FIG. 6)). EHT MU PPDU is used for both single user transmission and multi-user transmission. The EHT MU PPDU is not a response to a triggering frame. In the EHT MU PPDU, the EHT-SIG field is present. EHT TB PPDU is used for a transmission that is a response to a triggering frame from an AP. In the EHT TB PPDU, the EHT-SIG field is not present. The fields of the EHT PPDU formats are summarized in Table 2.

TABLE 2

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| U-SIG | Universal SIGNAL field |
| EHT-SIG | EHT SIGNAL field |
| EHT-STF | EHT Short Training field |
| EHT-LTF | EHT Long Training field |
| Data | The Data field carrying the PSDL(s) |
| PE | Packet extension field |

EHT duplicate (DUP) transmission is a mode wherein the transmitted data in the payload portion of the PPDU is duplicated in frequency. EHT DUP mode is an optional feature that is applicable only in the 6 GHz band. EHT DUP mode is applicable only for single user transmission in an EHT MU PPDU over bandwidth 80/160/320 MHz without preamble puncturing. It is applicable only in conjunction with BPSK-DCM modulation, rate-1/2 LDPC coding, and one spatial stream.

EHT DUP mode is signalled by setting the PPDU Type And Compression Mode subfield of U-SIG to 1 to indicate an EHT transmission to single user, and setting the modulation and coding scheme (MCS) field in EHT-SIG field to 14.

In EHT DUP mode, the encoding and modulation are described as follows:

For an 80 MHz EHT MU PPDU transmitted in EHT DUP mode, encoding and binary phase shift keying (BPSK)-dual carrier modulation (DCM) modulation are done for the first (e.g. lower) 484-tone RU, and then the first 484-tone RU is duplicated to the second (e.g. upper) 484-tone RU along with a partial sign change to reduce peak-to-average power ratio (PAPR).

For a 160 MHz EHT MU PPDU transmitted in EHT DUP mode, encoding and BPSK-DCM modulation are done for the first 996-tone RU, and then the first 996-tone RU is duplicated to the second 996-tone RU along with a partial sign change to reduce PAPR.

For a 320 MHz EHT MU PPDU transmitted in EHT-DUP mode, encoding and BPSK-DCM modulation are done for first 2×996-tone RU, and then the first 2×996-tone RU is duplicated to the second 2×996-tone RU along with a partial sign change to reduce PAPR.

The above frequency domain duplication occurs after low density parity check code (LDPC) tone mapping and segment deparsing operations if present. The details of the duplication and partial sign change operations are described as below.

Figure 7:
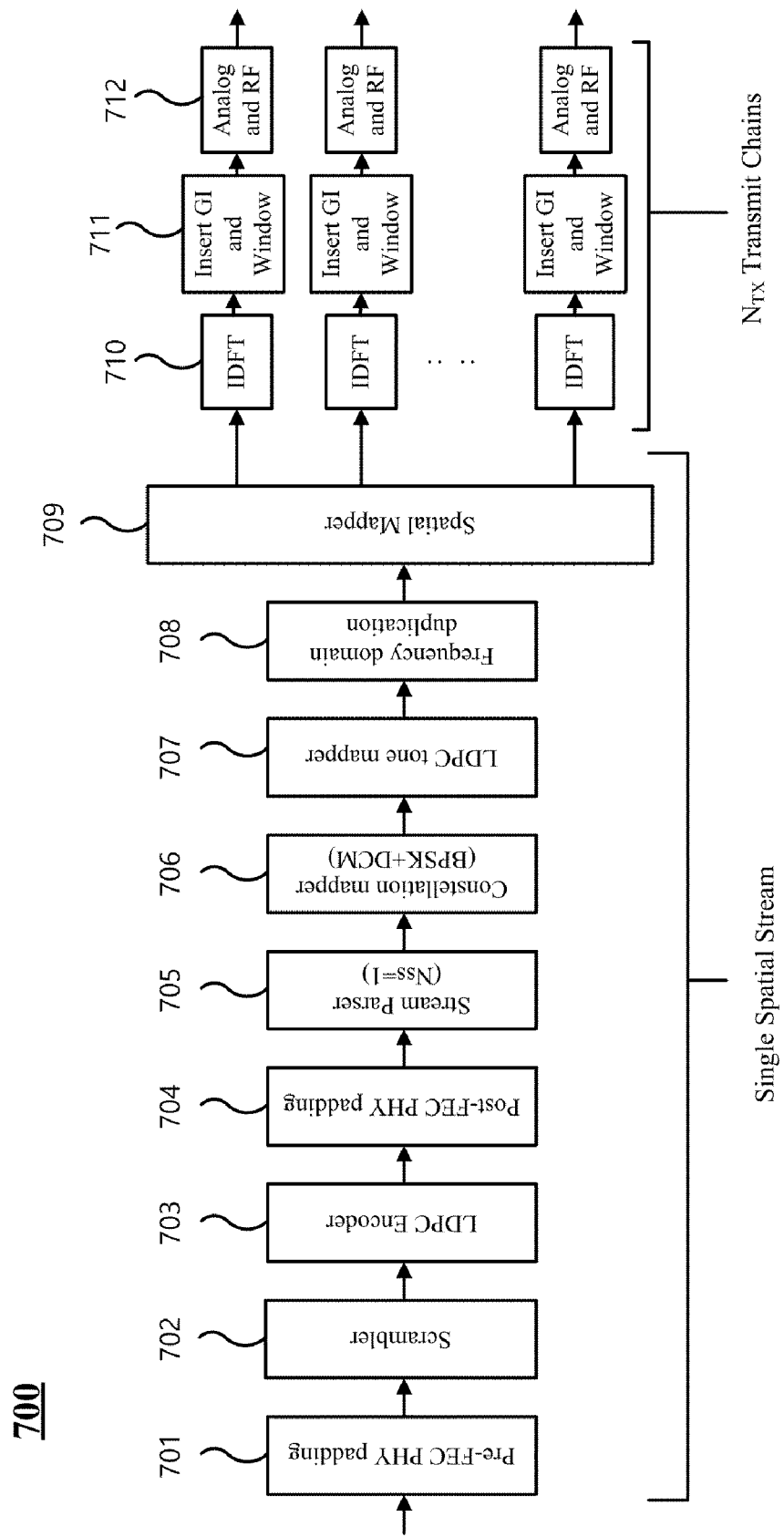
FIG. 7 illustrates a block diagram of a transmitter for the transmission of the 80 MHz EHT MU PPDU and the 160 MHz EHT MU PPDU with EHT DUP mode according to an embodiment of the present disclosure.

FIG. 7 illustrates a block diagram of transmitter for the transmission of the 80 MHz EHT MU PPDU and the 160 MHz EHT MU PPDU with EHT DUP mode according to an embodiment of the present disclosure.

Referring to FIG. 7, the transmitter 700 includes pre-FEC PHY padding module 701, scrambler 702, LDPC encoder 703, post-FEC padding module 704, stream parser 705, constellation mapper 706, LDPC tone mapper 707, frequency domain duplication module 708 and spatial mapper 709 for single spatial stream and a plurality of IDFT modules 710, a plurality of insert GI and window modules 711, and a plurality of analog and RF modules 712 for a plurality of transmit chains. A data signal passes through the pre-FEC PHY padding module 701, the scrambler 702, the LDPC encoder 703, the post-FEC padding module 704, and the stream parser 705. In EHT DUP mode, for 80 MHz EHT MU PPDU with 484-tone RU and the 160 MHz EHT MU PPDU with 996-tone RU, the segment parser (not shown) is bypassed and BPSK modulation with DCM (BPSK-DCM modulation) is done for an input signal of the constellation mapper 706 (also, output signal of the stream parser 705) as shown in Equation 1.

$$y=[x \ x_{DCM}], \text{ where } x_{DCM}=(-1)^{k+N_{SD}}\ast x \text{ and } k=[0,\ldots,N_{SD}-1]$$ Equation 1

Here, x is the input signal of the constellation mapper 706, y is an output signal of the constellation mapper 706, and $N_{SD}$ is a number of subcarriers (or tones). Here A.*B means element wise multiplication between A matrix and B matrix.

The output signal of the constellation mapper 706 passes through the LDPC tone mapper 707 and is duplicated to map to two RUs by the frequency domain duplication module 708 as shown in Equation 2.

$$z=[y \ -x \ x_{DCM}]$$ Equation 2

Here, z is an output signal of the frequency domain duplication module 708 and y is the signal out of the constellation mapper 706 to which LDPC tone mapping is performed by the LDPC tone mapper 707.

Subsequently, the output signal of the frequency domain duplication module 708 passes through the spatial mapper 709, one of the plurality of IDFT modules 710, one of the plurality of insert GI and window modules 711 and one of the plurality of analog and RF modules 712.

Figure 8:
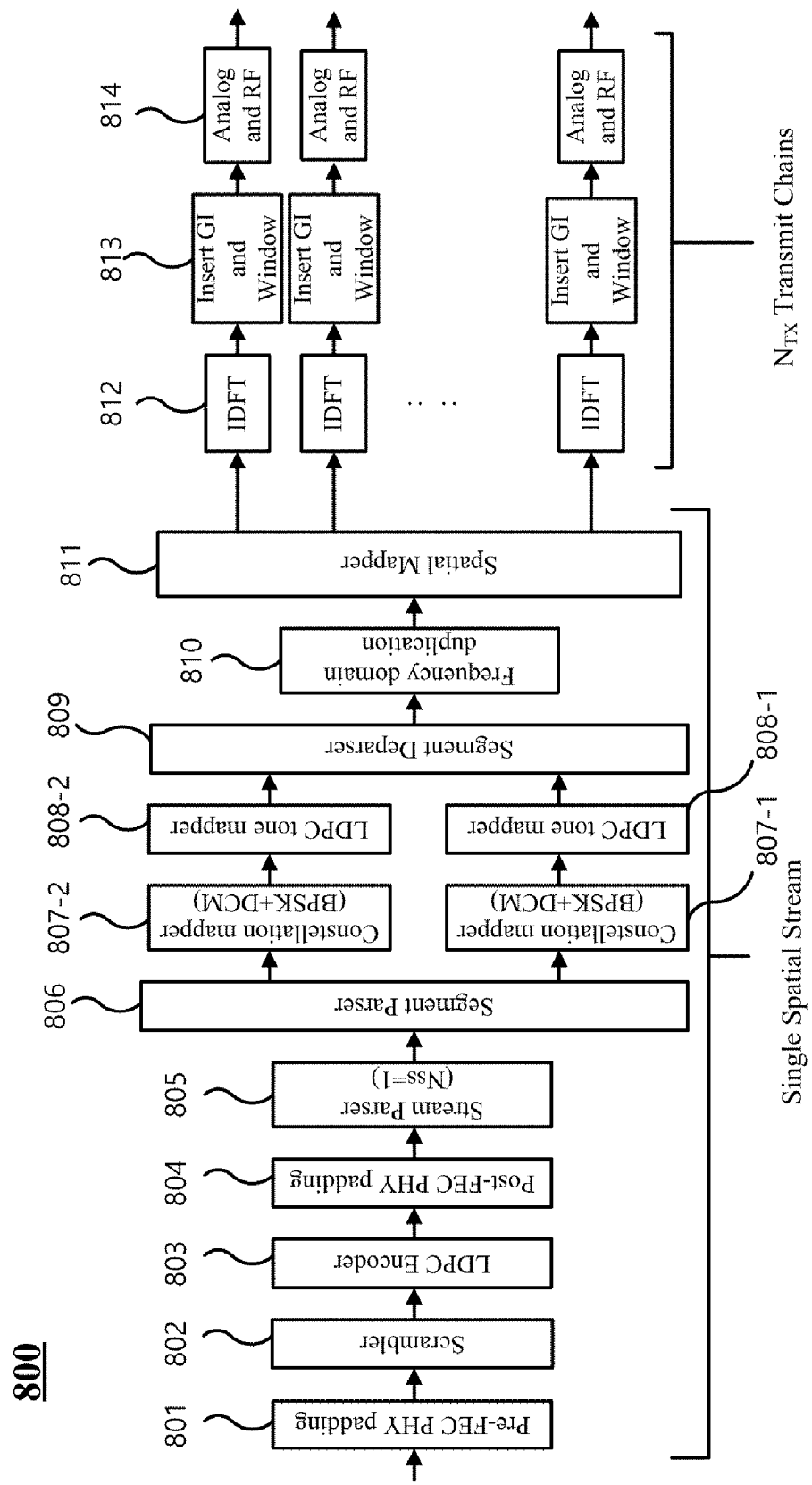
FIG. 8 illustrates a block diagram of a transmitter for the transmission of the 320 MHz EHT MU PPDU with EHT DUP mode according to an embodiment of the present disclosure.

FIG. 8 illustrates a block diagram of transmitter for the transmission of the 320 MHz EHT MU PPDU with EHT DUP mode according to an embodiment of the present disclosure.

Referring to FIG. 8, the transmitter 800 includes pre-FEC PHY padding module 801, scrambler 802, LDPC encoder 803, post-FEC padding module 804, stream parser 805, segment parser 806, lower constellation mapper 807-1, upper constellation mapper 807-2, lower LDPC tone mapper 808-1, upper LDPC tone mapper 808-2, segment deparser 809, frequency domain duplication module 810 and spatial mapper 811 for single spatial stream and a plurality of IDFT modules 812, a plurality of insert GI and window modules 813, and a plurality of analog and RF modules 814 for a plurality of transmit chains. A data signal passes through the pre-FEC PHY padding module 801, the scrambler 802, the LDPC encoder 803, the post-FEC padding module 804, the stream parser 805, and the segment parser 806. In EHT DUP mode, for 320 MHz EHT MU PPDU, the output signal of segment parser 806 is divided into lower output signal as lower input signal of the lower constellation mapper 807-1 and upper output signal as upper input signal of the upper constellation mapper 807-2. BPSK modulation with DCM (BPSK-DCM modulation) is done for the lower input signal of the lower constellation mapper 807-1 as shown in Equation 3 and the upper input signal of the upper mapper constellation 807-2 as shown in Equation 4.

$$y_L = [x_L x_{L,DCM}], \text{ where } x_{L,DCM} = (-1)^{k+N_{SD}} \cdot x_L \text{ and } k = [0, \ldots, N_{SD}/2 - 1] \quad \text{Equation 3}$$

Here, $x_L$ is the lower input signal of the lower constellation mapper 807-1 over lower $N_{SD}/2$ subcarriers, and $y_L$ is an output signal of the lower constellation mapper 807-1, and $N_{SD}$ is a number of subcarriers (or tones).

$$y_U = [x_U x_{U,DCM}], \text{ where } x_{U,DCM} = (-1)^{k+3/2N_{SD}} \cdot x_U \text{ and } k = [0, \ldots, N_{SD}/2 - 1] \quad \text{Equation 4}$$

Here, $x_U$ is the lower input signal of the upper constellation mapper 807-2 over upper $N_{SD}/2$ subcarriers, and $y_U$ is an output signal of the upper constellation mapper 807-2, and $N_{SD}$ is a number of subcarriers (or tones).

The lower output signal of the lower constellation mapper 807-1 to which LDPC tone mapping is performed by the lower LDPC tone mapper 808-1 and the upper output signal of the upper constellation mapper 807-2 to which LDPC tone mapping is performed by the upper LDPC tone mapper 808-2 are combined by the segment deparser 809 as shown in Equation 5.

$$y = [x_L x_{L,DCM} x_U x_{U,DCM}] \quad \text{Equation 5}$$

Here, y is an output of the segment deparser 809.

The output signal of the segment deparser 809 is duplicated to map to two RUs by the frequency domain duplication module 810 as shown in Equation 6.

$$z = [y - x_L - x_{L,DCM} x_U x_{U,DCM}] \quad \text{equation 6}$$

Here, z is an output signal of the frequency domain duplication module 810.

Subsequently, the output signal of the frequency domain duplication module 810 passes through the spatial mapper 811, one of the plurality of IDFT modules 812, one of the plurality of insert GI and window modules 813 and one of the plurality of analog and RF modules 814.

Some notations in EHT-MCS 14 for EHT DUP mode when NSS,u=1 are defined in Table 3.

TABLE 3

| Modulation | Bandwidth | R | $N_{BPSCS}$ | $N_{SD}$ | $N_{CBPS}$ | $N_{DBPS}$ | Data rate (Mb/s) | | |
|---|---|---|---|---|---|---|---|---|---|
| | | | | | | | 0.8 μs GI | 1.6 μs GI | 3.2 μs GI |
| BPSK-DCM | 80 MHz | ½ | 1 | 234 | 234 | 117 | 8.6 | 8.1 | 7.3 |
| BPSK-DCM | 160 MHz | ½ | 1 | 490 | 490 | 245 | 18.0 | 17.0 | 15.3 |
| BPSK-DCM | 320 MHz | ½ | 1 | 980 | 980 | 490 | 36.0 | 34.0 | 30.6 | where R is the coding rate for the user, $N_{BPSCS}$ is the number of coded bit per subcarrier per spatial stream, $N_{SD}$ is the number of data subcarriers, $N_{CBPS}$ is the number of coded bits per OFDM symbol, and $N_{DBPS}$ is the number of data bits per OFDM symbol.

The EHT-STF, EHT-LTF, and pilot subcarriers for an 80 MHz EHT MU PPDU transmitted in EHT DUP mode are constructed in an identical manner to those of an EHT MU PPDU transmitted in OFDMA format with 484-tone RU1 and RU2 occupied. The EHT-STF, EHT-LTF, and pilot subcarriers for a 160/320 MHz EHT MU PPDU transmitted in EHT DUP mode are constructed in an identical manner to those of a 160/320 MHz EHT MU PPDU transmitted in non-OFDMA format.

Considering wider bandwidth such as 320 MHz channel bandwidth on 6 GHz, it might be hard for one STA to occupy entire bandwidth because of incumbent devices or previous amendment devices (e.g. 11ax compliant devices). For example, since 11ax STAs capable of 80/160 MHz operation decode the preamble on primary 20 MHz subchannel first to get the control information (e.g. bandwidth information) from SIG field to decode further the rest portion of the PPDU, 11ax STAs are likely to stay at least within primary 80 MHz channel (or the primary 160 MHz channel). The same rule could be applied to 20/40 MHz capable STAs. To increase the efficiency, a new mechanism could be introduced. For example, the new mechanism enables multiplexing of EHT STAs with different amendment compliant devices such as 11ax or beyond EHT STAs (EHT+STAs).

Figure 9:
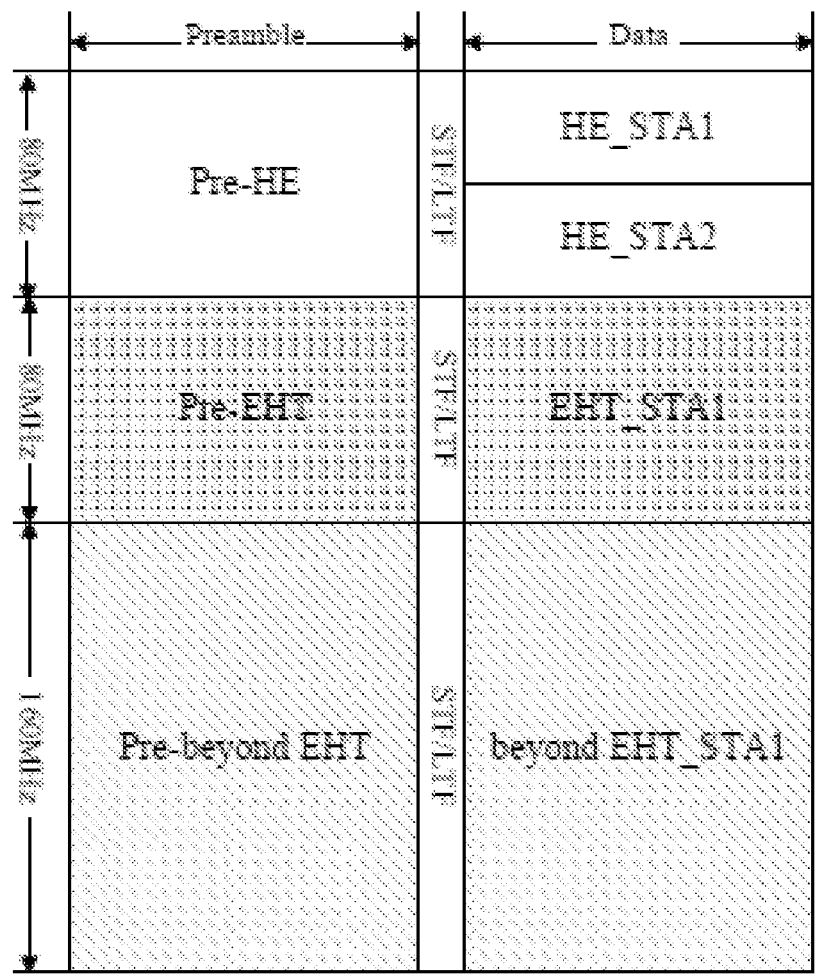
FIG. 9 illustrates an example of A-PPDU according to an embodiment of the present disclosure.

FIG. 9 illustrates an example of A-PPDU according to an embodiment of the present disclosure.

Referring to FIG. 9, A (aggregated)-PPDU includes multiple sub-PPDUs. The pre-HE, pre-EHT, and pre-beyond EHT denote the preamble parts of sub-PPDUs for three different amendments, i.e., HE, EHT, and beyond EHT, respectively. Each sub-PPDU could occupy non-overlapping of frequency segments where the sub-PPDUs are orthogonal in frequency domain symbol-by-symbol. A-PPDU could be transmitted in both downlink and uplink. Hereafter, once this present disclosure describes those certain features are supported for EHT devices, it could be applicable for beyond EHT without any additional description.

The 11ax devices camp on the primary 80 MHz channel (or the primary 160 MHz channel) and fully reuse the 11ax processing procedure. In terms of the HE STAs, all flows should be transparent during the multiplexing period time. However, as for EHT and EHT+STAs, those STAs could figure out the new rules to be defined and process its own assigned portion correctly. The new structure and rule could contain the method that EHT and EHT+devices could camp on secondary channels. Without information transmitted over the primary 20 MHz subchannel or with the corresponding information previously being shared before this procedure (based on SST (subchannel selective transmission) operation or etc, for example), those devices can work out. In order to support those new structure to multiplex different amendment STAs, there are several requirements such as consistent tone spacing between different amendment STAs, symbol alignment by the same tone spacing or the same GI values or same MCS for SIG portion or data portion between 80 MHz segments or 160 MHz segment depending on the STAs capable bandwidth.

With SST condition, non-punctured HE PPDU could be transmitted over secondary channels (not occupying the primary 20 MHz). In this case, EHT STAs could occupy the sub-PPDU with the primary 20 MHz. SST operation has been introduced as one of 11ax capabilities as below. It means if capabilities allowed, non-punctured RU (contiguous 20, 40, or 80 MHz PPDU) could be assigned to the secondary 80 MHz within 160 MHz supported in SST operation in 11ax.

An HE AP shall not allocate an RU outside of the primary 80 MHz channel in a 160 MHz or 80+80 MHz HE MU or HE TB PPDU to an 80 MHz operating non-AP HE STA if the non-AP STA has set the HE Subchannel Selective Transmission Support subfield in the HE MAC Capabilities Information field in the HE Capabilities element to 0.

An HE AP shall not allocate an RU outside of the primary 80 MHz subchannel in a 160 MHz or 80+80 MHz HE MU or HE TB PPDU to an 80 MHz operating non-AP HE STA if the non-AP STA has set the HE Subchannel Selective Transmission Support subfield in the HE MAC Capabilities Information field in the HE Capabilities element to 1 but has not set up SST operation on the secondary 80 MHz channel with the HE AP.

The TXVECTOR parameter CH_BANDWIDTH (e.g. Channel bandwidth information) of a DL MU PPDU is not set to HE-CBWPUNC160-PRI20, HE-CBW-PUNC80+80-PRI20, HE-CBW-PUNC160-SEC40 or HE-CBWPUNC80+80-SEC40 (e.g. punctured channel bandwidth defined in the bandwidth information in 11ax) if the DL MU PPDU is addressed to at least one HE SST non-AP STA that is an 80 MHz operating STA operating in a secondary subchannel.

However, 11be is likely to support SSP operation with a preamble puncturing. A puncturing pattern could be applied to one or more 20 MHz subchannels in A-PPDU. The concept of preamble puncturing has been introduced since 11ax and feature-extended in 11be for further usages. It is a mechanism that OFDMA, non-OFDMA (e.g. single user transmission or full bandwidth MU-MIMO transmission) are used to avoid transmissions in certain subcarriers. For PPDU bandwidths greater than or equal to 80 MHz, the PHY supports preamble punctured MU PPDU transmissions where pre-HE/EHT modulated fields (before HE/EHT STF field) are not transmitted in one or more of the nonprimary 20 MHz subchannels, and RUs associated with those punctured 20 MHz subchannels are not allocated. In MU PPDU, there is a field to indicate which subchannels are punctured. For example, HE SIG-A field contains bandwidth field and U-SIG field contains puncturing information field. For example, EHT variant Trigger frame contains RU/MRU location field which are assigned over non-punctured 20 MHz subchannels.

In addition to the puncturing information in PHY preamble portion of the PPDU, the indication of which subchannels are punctured in PPDU can be conveyed from the MAC to the PHY through the TXVECTOR parameter INACTIVE_SUBCHANNELS. Given 11be supporting up to 320 MHz channel bandwidth, its size should be 16 bits. An EHT STA shall set the TXVECTOR parameter INACTIVE_SUBCHANNELS of an PPDU based on the value indicated in the most recently exchanged Disabled Subchannel Bitmap field in the EHT Operation element for a BSS. In that EHT BSS, an EHT AP transmits the Disabled Subchannel Bitmap field in the EHT Operation element as shown in FIG. 10 below.

Figure 10:
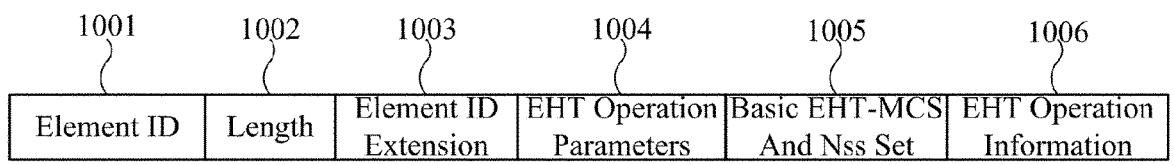
FIG. 10 illustrates an example of the EHT Operation element according to an embodiment of the present disclosure.
Figure 10:
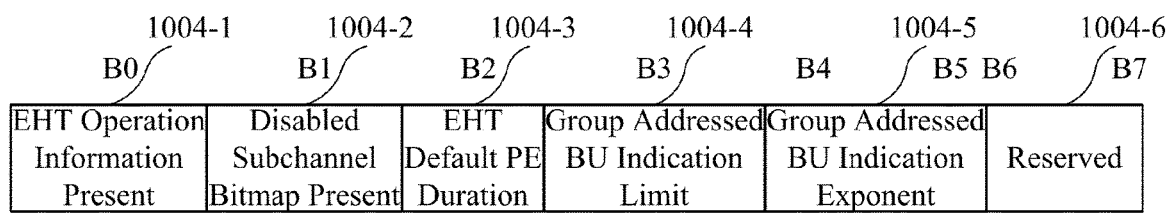
Figure 10:
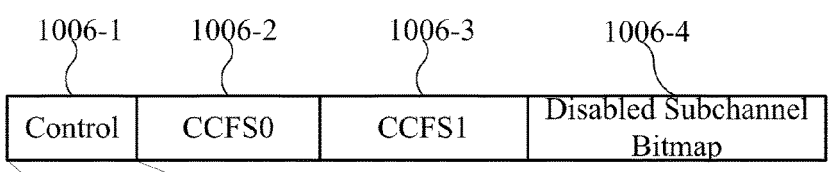
Figure 10:
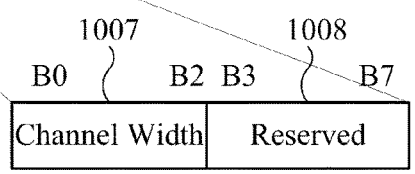

FIG. 10 illustrates an example of the EHT Operation element according to an embodiment of the present disclosure. A (a) of FIG. 10 is an example of the EHT Operation element format, a (b) of FIG. 10 is an example of EHT Operation Parameters field format, and a (c) of FIG. 10 is an example of EHT Operation Information format.

Referring to FIG. 10, the format of the EHT Operation element 1000 includes Element ID field 1001, Length field 1002, Element ID Extension field 1003, EHT Operation Parameters field 1004, Basic EHT-MCS And Nss Set field 1005, and EHT Operation Information field 1006. The EHT Operation element is identified by the Element ID field 1001 and, if present, the Element ID Extension field 1003. The Length field 1002 indicates the number of octets in the EHT Operation element excluding the Element ID field 1001 and the Length field 1002. The EHT Operation Parameters field 1004 includes EHT Operation Information Present subfield 1004-1, Disabled Subchannel Bitmap Present subfield 1004-2, EHT Default PE Duration subfield 1004-3, Group Addressed BU Indication Limit subfield 1004-4, Group Addressed BU Indication Exponent subfield 1004-5, and Reserved subfield 1004-6. The Basic EHT-MCS And NSS Set field 1005 indicates the EHT-MCSs for each number of spatial streams in EHT PPDUs that are supported by all EHT STAs in the BSS in transmit and receive. The EHT Operation Information field 1006 includes Control subfield 1006-1, channel center frequency segment 0 (CCFS0) subfield 1006-2, CCFS1 subfield 1006-3, and Disabled Subchannel Bitmap subfield 1006-4. The Control subfield 1006-1 of the EHT Operation Information field 1006 includes Channel Width subfield 1007 and Reserved subfield 1008. The EHT Operation Information Present subfield 1004-1 is set to 1 if the EHT Operation Information field 1006 is present and set to 0 otherwise. The EHT Operation Information Present subfield 1004-1 is set to 1 if the channel width indicated in an HT Operation, VHT Operation, or HE Operation element that is present in the same Management frame is different from the Channel Width subfield 1007 indicated in the EHT Operation Information field 1006. The Disabled Subchannel Bitmap Present subfield 1004-2 is set to 1 if the Disabled Subchannel Bitmap subfield 1006-4 indicated in the EHT Operation Information field 1006 is present and set to 0 otherwise. The Disabled Subchannel Bitmap Present subfield 1004-2 is valid only when the HT Operation Information Present subfield is set to 1. The EHT Default PE Duration subfield 1004-3 is set to 1 to indicate that the PE field duration for an EHT TB PPDU solicited by a TRS Control subfield is 20 µs and set to 0 to indicate that the PE field duration is the same as that indicated in the HE Operation Parameters field in the HE Operation element.

The Group Addressed BU Indication Limit subfield 1004-4 indicates whether there is a limit on the number of bits to indicate the presence of buffered group addressed frames of all other APs affiliated with the same AP MLDs as all nontransmitted BSSIDs in a multiple BSSID set in the TIM element or not. The Group Addressed BU Indication Limit subfield 1004-4 is set to 0 if one of the conditions is met: (i) the AP is not in multiple BSSID set, (ii) the AP is in multiple BSSID set and the total number of bits needed to indicate the presence of buffered group addressed frames of all other Aps affiliated with the same AP multi-link devices(MLDs) as all nontransmitted BSSID in the traffic indication map (TIM) element is not greater than 48 bits. Otherwise, the Group Addressed BU Indication Limit subfield 1004-4 is set to 1. The Group Addressed BU Indication Exponent subfield 1004-5 is set to the exponent from which N is calculated. The EHT Operation Information field 1006 is present if the EHT Operation Information Present subfield 1004-1 is equal to 1; otherwise the EHT Operation Information field 1006 is not present. The EHT STA obtains the channel configuration information from the EHT Operation Information field 1006, if present, in the EHT Operation element 1000. The Channel Width subfield 1007, CCFS0 subfield 1006-2, and CCFS1 subfield 1006-3 are defined in Table 4 and Table 5. The Disabled Subchannel Bitmap subfield 1006-4 is present if the Disabled Subchannel Bitmap Present subfield 1004-2 is equal to 1 and provides a list of subchannels that are punctured within the BSS bandwidth; otherwise the Disabled Subchannel Bitmap Present subfield 1004-2 is not present. The Disabled Subchannel Bitmap subfield 1006-4 is a 16-bit bitmap where the lowest numbered bit corresponds to the 20 MHz subchannel that lies within the BSS bandwidth and that has the lowest frequency of the set of all 20 MHz subchannels within the BSS bandwidth. Each successive bit in the bitmap corresponds to the next higher frequency 20 MHz subchannel. A bit in the bitmap is set to 1 to indicate that the corresponding 20 MHz subchannel is punctured and is set to 0 to indicate that the corresponding 20 MHz subchannel is not punctured.

TABLE 5

| Channel Width subfield | CCFS1 subfield | EHT BSS channel width (MHz) |
|---|---|---|
| 0 | 0 | 20 |
| 1 | 0 | 40 |
| 2 | 0 | 80 |
| 3 | CCFS1 > 0 and \|CCFS1 − CCFS0\| = 8 | 160 |
| 4 | CCFS1 > 0 and \|CCFS1 − CCFS0\| = 16 | 320 |

The EHT STA obtains the channel configuration information from EHT Operation element. The subfields of EHT Operation Information field are defined in the Table 4. The AP shall set the Disabled Subchannel Bitmap Present subfield to 1 and include the Disabled Subchannel Bitmap field in the EHT Operation element if the AP punctures any subchannel for the BSS. Otherwise, the AP shall set the Disabled Subchannel Bitmap Present subfield to 0 and not include the Disabled Subchannel Bitmap field in the EHT Operation element.

The AP sets each bit in the Disabled Subchannel Bitmap field to a value as the following constraints:

The puncturing pattern indicated in the Disabled Subchannel Bitmap field of the EHT Operation element shall be one of the non-OFDMA puncturing patterns in Table 6.

TABLE 6

| PPDU bandwidth | Cases | Puncturing pattern | Field value |
|---|---|---|---|
| 20/40 MHz | No puncturing | [1 1 1 1] | 0 |
| 80 MHz | No puncturing | [1 1 1 1] | 0 |
| | 20 MHz puncturing | [x 1 1 1] | 1 |
| | | [1 x 1 1] | 2 |
| | | [1 1 x 1] | 3 |
| | | [1 1 1 x] | 4 |

TABLE 4

| Subfield | Definition | Encoding |
|---|---|---|
| Channel Width | This subfield defines the EHT BSS bandwidth. | Set to 0 for 20 MHz EHT BSS bandwidth. Set to 1 for 40 MHz EHT BSS bandwidth. Set to 2 for 80 MHz EHT BSS bandwidth. Set to 3 for 160 MHz EHT BSS bandwidth. Set to 4 for 320 MHz EHT BSS bandwidth. Values in the ranges 5 to 7 are reserved. |
| CCFS0 | This subfield defines a channel center frequency for a 20, 40, 80, 160, or 320 MHz EHT BBS. | For 20, 40 or 80 MHz BSS bandwidth, indicates the channel center frequency index for the 20, 40 or 80 MHz channel on which the EHT BSS operates. For 160 MHz BSS bandwidth, indicates the channel center frequency index of the primary 80 MHz channel. For 320 MHz BSS bandwidth, indicates the channel center frequency index of the primary 160 MHz channel. |
| CCFS1 | This subfield defines a channel center frequency for a 160 or 320 MHz EHT BBS. | For a 20, 40 or 80 MHz BSS bandwidth, this subfield is set to 0. For a 160 MHz BSS bandwidth, indicates the channel center frequency index of the 160 MHz channel on which the EHT BSS operates. For a 320 MHz BSS bandwidth, indicates the channel center frequency index of the 320 MHz channel on which the EJT BSS operates. See Table 5 (EHT BSS channel width) |

TABLE 6-continued

| PPDU bandwidth | Cases | Puncturing pattern | Field value |
|---|---|---|---|
| 160 MHz | No puncturing | [1 1 1 1 1 1 1 1] | 0 |
| | 20 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| 320 MHz | No puncturing | [1 1 1 1 1 1 1 1] | 0 |
| | 40 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 80 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| | 320-80-40 | [x x x 1 1 1 1 1] | 13 |
| | | [x x 1 x 1 1 1 1] | 14 |
| | | [x x 1 1 x 1 1 1] | 15 |
| | | [x x 1 1 1 x 1 1] | 16 |
| | | [x x 1 1 1 1 x 1] | 17 |
| | | [x x 1 1 1 1 1 x] | 18 |
| | | [x 1 1 1 1 1 x x] | 19 |
| | | [1 x 1 1 1 1 x x] | 20 |
| | | [1 1 x 1 1 1 x x] | 21 |
| | | [1 1 1 x 1 1 x x] | 22 |
| | | [1 1 1 1 x 1 x x] | 23 |
| | | [1 1 1 1 1 x x x] | 24 |

Note that in the puncturing patterns in Table 6 above, a "1" denotes a non-punctured subchannel and an "x" denotes a punctured subchannel. The puncturing granularity for 80 MHz and 160 MHz PPDU bandwidth is 20 MHz, and the puncturing granularity for 320 MHz PPDU bandwidth is 40 MHz.

In addition to the defined puncturing patterns so far, if needed, additional puncturing could be applied to the PPDU. The EHT STA may use EHT MU PPDU preamble puncturing patterns as defined for OFDMA mode or EHT TB PPDU in which not all the 20 MHz sub-channels are assigned. As for EHT TB PPDU, the EHT AP shall assign an RU or MRU within the non-punctured subchannel set to a responding EHT STA using a triggering frame. For DL OFDMA cases, a 4-bit bitmap that tells which 20 MHz channel is punctured in the relevant 80 MHz subblock is defined. A value of 0 indicates that the corresponding 20 MHz channel is punctured. The allowed punctured patterns are defined for an 80 MHz subblock: 1111, 0111, 1011, 1101, 1110, 0011, 1100, and 1001. Its value could be variable for each 80 MHz subblock when channel operating bandwidth is larger than 80 MHz.

This present disclosure considers the case that A-PPDU contains DUP transmission as sub-PPDU(s). The coverage of HE PPDU and EHT PPDU with DUP might not be comparable each other. With some embodiments, EHT AP could improve overall performance for HE STAs and EHT STAs when transmitting A-PPDU consisting of both HE PPDU and EHT PPDU. Each embodiment could be supported separately or jointly.

Embodiment 1

HE ER SU PPDU could be assigned for HE STAs in A-PPDU wherein this HE PPDU is transmitted with EHT MU PPDU together. HE ER SU PPDU (16 μs HE-SIG-A field) and EHT MU PPDU in DUP mode (8 μs U-SIG and 8 μs EHT-SIG fields) could meet the alignment requirement.

The EHT-SIG field of EHT MU PPDU provides additional signalling to the U-SIG field for STAs to interpret EHT MU PPDU. In EHT MU PPDU, the EHT-SIG field includes U-SIG overflow bits that are common to all users. The EHT-SIG field further includes resource allocation information to allow the STAs to look up the corresponding resources to be used in the EHT modulated fields of the PPDU. The integer fields of the EHT-SIG field are transmitted in unsigned binary format, LSB first, where the LSB is in the lowest numbered bit position.

The EHT-SIG field of EHT MU PPDU includes at least one EHT-SIG content channel. For example, the EHT-SIG field of a 20 MHz EHT MU PPDU includes one EHT-SIG content channel. For example, for non-OFDMA transmission to multiple users, the EHT-SIG field of an EHT MU PPDU that is 40 MHz or 80 MHz includes two EHT-SIG content channels. For example, for non-OFDMA transmission to multiple users, the EHT-SIG field of an MU PPDU that is 160 MHz or wider includes two EHT-SIG content channels per 80 MHz. The EHT-SIG field of an EHT MU PPDU sent to a single user includes one EHT-SIG content channel and it is duplicated in each nonpunctured 20 MHz when the EHT PPDU is equal to or wider than 40 MHz.

Figure 11:
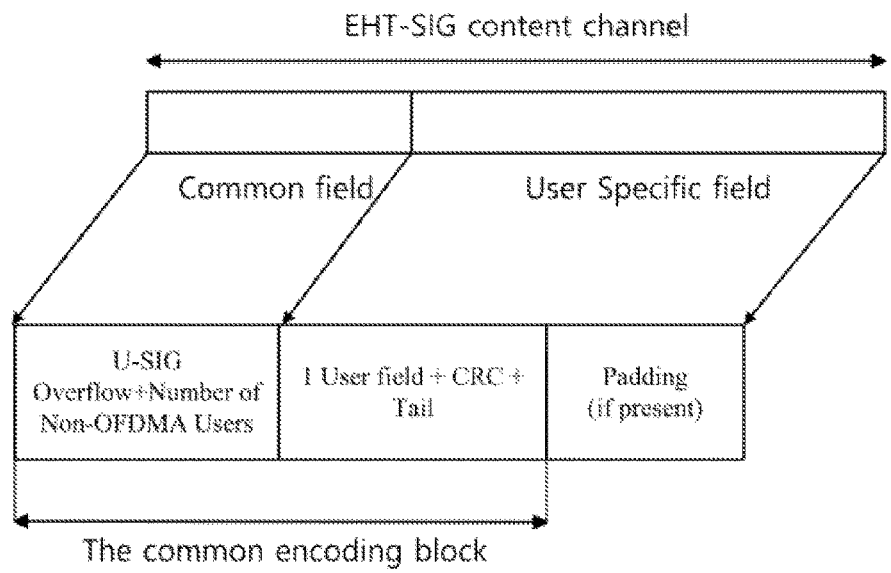
FIG. 11 illustrates an example of EHT-SIG content channel format for non-OFDMA transmission according to an embodiment of the present disclosure.
Figure 11:
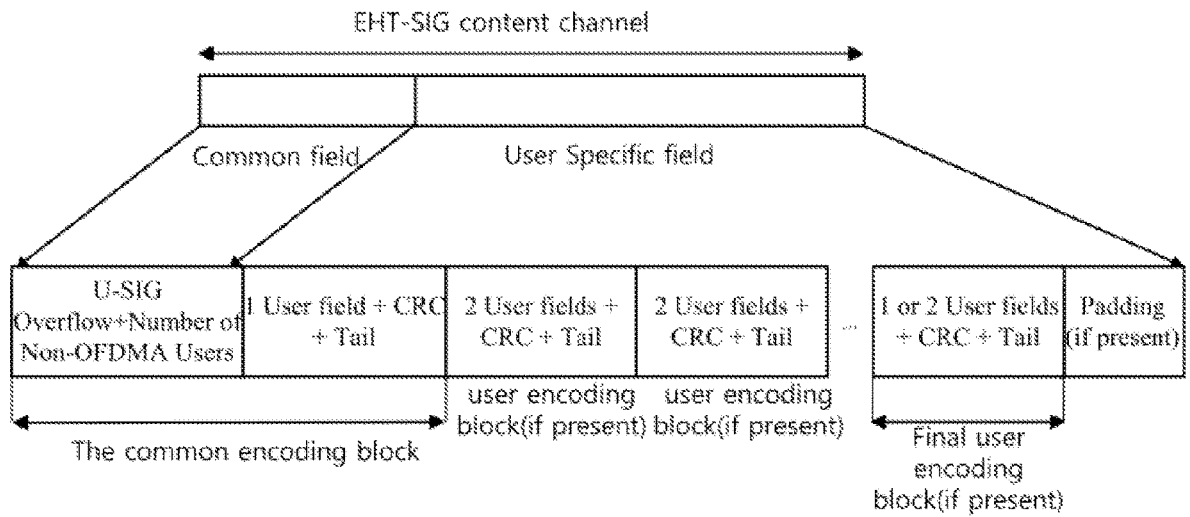

FIG. 11 illustrates an example of EHT-SIG content channel format for non-OFDMA transmission according to an embodiment of the present disclosure. A (a) of FIG. 11 is an example of EHT-SIG content channel format for non-OFDMA transmission to a single user and a (b) of FIG. 11 is an example of EHT-SIG content channel format for non-OFDMA transmission to multiple users.

Referring to (a) of FIG. 11, in non-OFDMA transmission, the Common field of the EHT-SIG content channel does not include the RU Allocation subfield. For non-OFDMA transmission except for EHT sounding NDP, the Common field of the EHT-SIG content channel is encoded together with the first User field and this encoding block includes a CRC and Tail, referred to as a common encoding block. In the non-OFDMA transmission to single user, the User Specific field contains one User field but there exists no user encoding block.

Referring to (b) of FIG. 11, in non-OFDMA transmission, the Common field of the EHT-SIG content channel does not include the RU Allocation subfield. For non-OFDMA transmission except for EHT sounding NDP, the Common field of the EHT-SIG content channel is encoded together with the first User field and this encoding block includes a CRC and Tail, referred to as a common encoding block. In the non-OFDMA transmission to multiple users, the User Specific field is organized into user encoding blocks that in turn include User fields except for the first User field.

The content of the common encoding block in the EHT-SIG field for a non-OFDMA transmission to a single user and multiple users is defined in Table 7.

TABLE 7

| Bit | Subfield | Number of bits per subfield | Description |
|---|---|---|---|
| B0-B19 | Common field for non-OFDMA transmission to a single user and non-OFDMA transmission to multiple users | 20 | The Common field for non-OFDMA transmission to a single user and non-OFDMA transmission to multiple users is defined in Table 8. |
| B20-B41 | User field | 22 | The User field format for a non-MU-MIMO allocation is defined in Table 9. |
| B42-B45 | CRC | 4 | The CRC is calculated over bits 0 to 41. |
| B46-B51 | Tail | 6 | Used to terminate the trellis of the convolutional decoder. Set to 0. |

The Common field for non-OFDMA transmission to a single user, and non-OFDMA transmission to multiple users is defined in Table 8.

TABLE 8

| Bit | Subfield | Number of bits | Description |
|---|---|---|---|
| B0-B3 | Spatial Reuse | 4 | Indicates whether or not spatial reuse modes are allowed during the transmission of this PPDU. |
| B4-B5 | GI + LTF Size | 2 | Indicates the GI duration and EHT-LTF size:<br>Set to 0 to indicate 2 × LTF + 0.8 µs GI.<br>Set to 1 to indicate 2 × LTF + 1.6 µs GI.<br>Set to 2 to indicate 4 × LTF + 0.8 µs GI.<br>Set to 3 to indicate 4 × LTF + 3.2 µs GI. |
| B6-B8 | Number Of EHT-LTF Symbols | 3 | Indicate the number of EHT-LTF symbols:<br>Set to 0 to indicate 1 EHT-LTF symbol.<br>Set to 1 to indicate 2 EHT-LTF symbols.<br>Set to 2 to indicate 4 EHT-LTF symbols.<br>Set to 3 to indicate 6 EHT-LTF symbols.<br>Set to 4 to indicate 8 EHT-LTF symbols.<br>Other values are Validate if dot11EHTBaseLineFeaturesImplementedOnly equals true. |
| B9 | LDPC Extra Symbol Segment | 1 | Indicates the presence of the LDPC extra symbol segment:<br>Set to 1 if an LDPC extra symbol segment is present.<br>Set to 0 if an LDPC extra symbol segment is not present. |
| B10-B11 | Pre-FEC Padding Factor | 2 | Indicates the pre-FEC padding factor:<br>Set to 0 to indicate a pre-FEC padding factor of 4.<br>Set to 1 to indicate a pre-FEC padding factor of 1.<br>Set to 2 to indicate a pre-FEC padding factor of 2.<br>Set to 3 to indicate a pre-FEC padding factor of 3. |
| B12 | PE Disambiguity | 1 | Indicates PE disambiguity. |
| B13-B16 | Disregard | 4 | Set to all 1s. Disregard if dot11EHTBaseLineFeaturesImplementedOnly equals true. |
| B17-B19 | Number Of Non-OFDMA Users | 3 | Indicates the total number of non-OFDMA users. Set to n to indicate n + 1 non-OFDMA users. Set to 0 for non-OFDMA transmission to a single user and set to a value larger than 0 for non-OFDMA transmission to multiple users. Other values are Validate if dot11EHTB aseLineFeaturesImplementedOnly equals true. |

The User field format for a non-MU-MIMO allocation is defined in Table 9.

TABLE 9

| Bit | Subfield | Number of bits | Description |
|---|---|---|---|
| B0-B10 | STA-ID | 11 | Set to a value of the TXVECTOR parameter STA-ID |
| B11-B14 | MCS | 4 | If the STA-ID subfield is not equal to 2046, this subfield indicates the following modulation and coding scheme: |

TABLE 9-continued

| Bit | Subfield | Number of bits | Description |
|---|---|---|---|
|  |  |  | Set to n for EHT-MCS n, where n = 0, 1, . . . , 15. Set to an arbitrary value if the STA-ID subfield is equal to 2046. If the value of STA-ID subfield matches the user's STA-ID and if dot11EHTBaseLineFeaturesImplementedOnly equals true, the value of EHT-MCS 14 or EHT-MCS 15 is Validate if the condition is not met. If the value of STA-ID subfield does not match the user's STA-ID and if dot11EHTBaseLineFeaturesImplementedOnly equals true, all values are Disregard. |
| B15 | Reserved | 1 | Reserved and set to 1. If the value of STA-ID subfield matches the user's STA-ID and if dot11EHTBaseLineFeaturesImplementedOnly equals true, the Reserved subfield is Validate. If the value of STA-ID subfield does not match the user's STA-ID and if dot11EHTBaseLineFeaturesImplementedOnly equals true, the Reserved subfield is Disregard. |
| B16-B19 | NSS | 4 | If the STA-ID subfield is not equal to 2046, it indicates the number of spatial streams for up to eight spatial streams. Set to the number of spatial streams minus 1. Set to an arbitrary value if the STA-ID subfield is equal to 2046. If the value of STA-ID subfield matches the user's STA-ID and if dot11EHTBaseLineFeaturesImplementedOnly equals true, other values are Validate. If the value of STA-ID subfield does not match the user's STA-ID and if dot11EHTBaseLineFeaturesImplementedOnly equals true, all values are Disregard. |
| B20 | Beamformed | 1 | If the STA-ID subfield is not 2046, this subfield is used to indicate transmit beamforming: Set to 1 if a beamforming steering matrix is applied to the waveform in a non-MU-MIMO allocation. Set to 0 otherwise. Set to an arbitrary value if the STA-ID subfield is 2046. |
| B21 | Coding | 1 | If the STA-ID subfield is not equal to 2046, this subfield indicates whether BCC or LDPC is used: Set to 0 for BCC. Set to 1 for LDPC. Set to an arbitrary value if the STA-ID subfield is 2046. If the value of STA-ID subfield does not match the user's STA-ID and if dot11EHTBaseLineFeaturesImplementedOnly equals true, all values are Disregard. |

EHT MU PPDU in DUP mode could be based on EHT MU PPDU for single transmission (e.g., (a) of FIG. 11). In this case, EHT SIG field is modulated with MCS0 (e.g. BPSK ½) which provides two OFDM symbols with 52 bits.

EHT MU PPDU in DUP mode could be based on EHT MU PPDU for multiple user transmission (e.g., (b) of FIG. 11). This case requires more space (e.g. more number of user related information shown in Table 10 and more bits in common for all users in EHT-SIG field). Since the length of EHT-SIG in EHT MU PPDU is variable depending on the number of assigned STAs, to meet the alignment in preamble portion, a value of EHT-SIG MCS field could be set 1 or 2 to be modulated with QPSK ½ and 16-QAM ½, respectively. With those EHT-SIG MCS field setting, the number of bits for each OFDM symbol in EHT-SIG field could be 52, and 104, respectively. In this case, with high MCS for EHT-SIG field, four OFDM symbols could be used to align the HE-SIG-A and U-SIG/EHT-SIG field wherein U-SIG contains 52 bits with two OFDM symbol and EHT-SIG contains more than 52 bits (e.g. 104, 208 bits) with two OFDM symbols.

TABLE 10

| Subfield | Number of subfields | Number of bits per subfield | Description |
|---|---|---|---|
| User field | N | 22 | N User fields are present, where: N = 1 if it is the final User Block field, and if there is only one user in the final User Block field. N = 2 otherwise. |

TABLE 10-continued

| Subfield | Number of subfields | Number of bits per subfield | Description |
| --- | --- | --- | --- |
| CRC | 1 | 4 | The CRC is calculated over bits 0 to 21 for a User Block field that includes one User field, and bits 0 to 43 for a User Block field that includes two User fields. |
| Tail | 1 | 6 | Used to terminate the trellis of the convolutional decoder. Set to 0. |

In HE ER SU PPDU in A-PPDU, there are some features that make it beneficial to extend (or match comparably) the coverage like DUP mode as followings.

X dB power boosting is applied to L-STF and L-LTF fields.
   It could be 3 dB boosting.
   When EHT AP sends HE ER SU PPDU, a value of power boosting in a specific range (e.g. [0, 3]) could be applied. This new value is transparent to HE STAs. For example, considering lower power environment, 0 dB power boosting could be applied. Currently DUP mode in PPDU does not apply the power boosting to L-STF and L-LTF fields.
   It could be useful when there is certain power restriction under specific band, channels, or conditions.

DCM could be applied to the Data field

Only 106-tone RU could be applied to increase the power spectral density comparing to 242-tone RU. It could be upper frequency 106-tone RU Power boost factor $\alpha_r$ in HE ER SU PPDU
   Currently set to 1 in HE ER SU PPDU which means no power boosting in data portion.
   When EHT AP sends HE ER SU PPDU, a value of power boosting in a specific range could be applied. This new value is transparent to HE STAs.

In EHT MU PPDU with DUP in A-PPDU, there are some features that make it beneficial to extend (or match comparably) the coverage.

X dB power boosting could be applied to L-STF and L-LTF fields.
   When EHT AP sends EHT MU PPDU, a value of power boosting in a specific range (e.g. [0, 3]) could be applied. For example, considering 3 dB power boosted HE-STF and HE LTF fields, 3 dB power boosting could be applied.
   Without A-PPDU concept introduced, current DUP mode in PPDU does not apply the power boosting factor to L-STF and L-LTF fields.

Regardless of embodiments, $\alpha_r$ is the power boost factor in the range [0.5, 2] of the r-th occupied in an HE PPDU. For a DL HE MU PPDU, an AP shall limit the ratio between maximum value of $\alpha_r$ and the minimum value of $\alpha_r$ to 2 unless the Power Boost Factor Support subfield of the HE PHY Capabilities Information field in the HE Capabilities element from all recipient STAs is 1, in which case the AP can use a ratio of up to 4. For EHT PPDU, different range could be introduced. When EHT AP transmits each sub-PPDUs with HE PPDU and EHT PPDU, the same ratio between max value of $\alpha_r$ and min value of $\alpha_r$ should be applied.

Embodiment 2

Different from the embodiment 1, instead of using HE ER SU PPDU, HE MU PPDU could be transmitted in A-PPDU to be combined with EHT MU PPDU supporting DUP mode. In HE MU PPDU in A-PPDU, there are some features that make it beneficial to extend (or match comparably) the coverage like DUP mode as follows.

X dB power boosting could be applied to L-STF and L-LTF fields.
   When EHT AP sends HE MU PPDU, a value of power boosting in a specific range (e.g. [0, 3]) could be applied. This new value is transparent to HE STAs. Currently HE MU PPDU does not support power boosting in L-STF and L-LTF.
   It could be 3 dB power boosting.
   It could be 0 dB power boosting. For example, the power boosting is not applied to EHT-STF and EHT-LTF fields in EHT PPDU with DUP mode for some cases.

DCM could be applied to the Data field

Power boost factor $\alpha_r$ in HE MU PPDU
   When EHT AP sends HE MU PPDU, a value of power boosting in a specific range could be applied.

In order to meet the alinement between HE MU PPDU and EHT MU PPDU in DUP mode, there are some features to be considered in HE MU PPDU (not limited to a single user transmission).

It requires more information to be assigned in HE-SIG-B field for users.

Higher MCS than MCS0 is required. Depending on a value in the HE-SIG-B-MCS Index field, one OFDM symbol of HE-SIG-B field could secure up to 208 bits. More detail is in Table 11 to limit the number of OFDM symbol of HE-SIG-B field to two OFDM symbols.

TABLE 11

| HE-SIG-B-MCS Index | DCM | Modulation | R | $N_{BPSCS}$ | $N_{SD}$ | $N_{CBPS}$ | $N_{DBPS}$ | HE-SIG-B rate(Mb/s) |
| --- | --- | --- | --- | --- | --- | --- | --- | --- |
| 0 | 1 | BPSK | ½ | 1 | 26 | 26 | 13 | 3.3 |
|  | 0 |  | ½ |  | 52 | 52 | 26 | 6.6 |
| 1 | 1 | QPSK | ½ | 2 | 26 | 52 | 26 | 6.6 |
|  | 0 |  | ½ |  | 52 | 104 | 52 | 13.2 |
| 2 | N/A |  | ¾ |  | 52 | 104 | 78 | 19.5 |
| 3 | 1 | 16-QAM | ½ | 4 | 26 | 104 | 52 | 13.2 |
|  | 0 |  | ½ |  | 52 | 208 | 104 | 26.0 |

TABLE 11-continued

| HE-SIG-B-MCS Index | DCM | Modulation | R | $N_{BPSCS}$ | $N_{SD}$ | $N_{CBPS}$ | $N_{DBPS}$ | HE-SIG-B rate(Mb/s) |
|---|---|---|---|---|---|---|---|---|
| 4 | 1 | | ¾ | | 26 | 104 | 78 | 19.5 |
|   | 0 | | ¾ | | 52 | 208 | 156 | 39.0 |
| 5 | N/A | 64-QAM | ⅔ | 6 | 52 | 312 | 208 | 52.0 |

NOTE-
The parameters $N_{SD}$, $N_{CBPS}$ and $N_{DBPS}$ are used for the HE-SIG-B field transmission in each 20 MHz subchannel.

Regardless of embodiments, the puncturing pattern defined in the Disabled Subchannel Bitmap field of the EHT Operation element or the parameter INACTIVE_SUBCHANNELs are allowed for A-PPDU transmission. The A-PPDU includes EHT MU PPDU in DUP mode as sub-PPDUs in addition to HE PPDU. In this case, sub-PPDU for EHT MU PPDU consists of contiguous 20 MHz subchannels. Table 12 shows the examples of A-PPDU transmission depending on the puncturing patterns in Disabled Subchannel Bitmap field. The basic assumption in Table 12 is that 80 MHz is the minimum bandwidth for DUP mode. For the case when SST is applicable to HE STA(s) which assigned for the secondary channel as one of sub-PPDUs, contiguous 20 MHz subchannels on the Operating Channel width of the BSS are allowed to transmit HE ER SU PPDU or HE MU PPDU. For the case when SST is not applicable to HE STA(s) which assigned for the primary channel as one of sub-PPDUs, 1) either contiguous or non-contiguous 20 MHz subchannels on the Operating Channel Width of the BSS are allowed to transmit HE MU PPDU or 2) contiguous 20 MHz subchannels on the Operation channel width of the BSS are allowed to transmit HE ER SU PPDU. In this present disclosure, the minimum bandwidth for DUP mode could be smaller than 80 MHz and the same method could be applicable as well.

TABLE 12

| Operating channel width of the BSS | Cases | Puncturing pattern in Disabled Subchannel Bitmap field | Field value |
|---|---|---|---|
| 20/40 MHz | No puncturing | Not present | Reserved |
| 80 MHz | No puncturing | Not present | Reserved |
|  | 20 MHz puncturing | [1 0 0 0 1 1 1 1 1 1 1 1 1 1 1 1] No A-PPDU | 1 |
|  |  | [0 1 0 0 1 1 1 1 1 1 1 1 1 1 1 1] No A-PPDU | 2 |
|  |  | [0 0 1 0 1 1 1 1 1 1 1 1 1 1 1 1] No A-PPDU | 3 |
|  |  | [0 0 0 1 1 1 1 1 1 1 1 1 1 1 1 1] No A-PPDU | 4 |
| 160 MHz | No puncturing | Not present | Reserved |
|  | 20 MHz puncturing | [1 0 0 0 0 0 0 0 1 1 1 1 1 1 1 1] 80 MHz DUP transmission allowed in A-PPDU | 1 |
|  |  | [0 1 0 0 0 0 0 0 1 1 1 1 1 1 1 1] 80 MHz DUP transmission allowed in A-PPDU | 2 |
|  |  | [0 0 1 0 0 0 0 0 1 1 1 1 1 1 1 1] 80 MHz DUP transmission allowed in A-PPDU | 3 |
|  |  | [0 0 0 1 0 0 0 0 1 1 1 1 1 1 1 1] 80 MHz DUP transmission allowed in A-PPDU | 4 |
|  |  | [0 0 0 0 1 0 0 0 1 1 1 1 1 1 1 1] 80 MHz DUP transmission allowed in A-PPDU | 5 |
|  |  | [0 0 0 0 0 1 0 0 1 1 1 1 1 1 1 1] 80 MHz DUP transmission allowed in A-PPDU | 6 |
|  |  | [0 0 0 0 0 0 1 0 1 1 1 1 1 1 1 1] 80 MHz DUP transmission allowed in A-PPDU | 7 |
|  |  | [0 0 0 0 0 0 0 1 1 1 1 1 1 1 1 1] 80 MHz DUP transmission allowed in A-PPDU | 8 |
|  | 40 MHz puncturing | [1 1 0 0 0 0 0 0 1 1 1 1 1 1 1 1] 80 MHz DUP transmission allowed in A-PPDU | 9 |
|  |  | [0 0 1 1 0 0 0 0 1 1 1 1 1 1 1 1] 80 MHz DUP transmission allowed in A-PPDU | 10 |
|  |  | [0 0 0 0 1 1 0 0 1 1 1 1 1 1 1 1] 80 MHz DUP transmission allowed in A-PPDU | 11 |

TABLE 12-continued

| Operating channel width of the BSS | Cases | Puncturing pattern in Disabled Subchannel Bitmap field | Field value |
|---|---|---|---|
| | | [0 0 0 0 0 0 1 1 1 1 1 1 1 1 1 1]<br>80 MHz DUP transmission allowed in A-PPDU | 12 |
| 320 MHz | No puncturing | Not present | Reserved |
| | 40 MHz puncturing | [1 1 0 0 0 0 0 0 0 0 0 0 0 0 0 0]<br>80/160 MHz DUP transmission allowed in A-PPDU | 1 |
| | | [0 0 1 1 0 0 0 0 0 0 0 0 0 0 0 0]<br>80/160 MHz DUP transmission allowed in A-PPDU | 2 |
| | | [0 0 0 0 1 1 0 0 0 0 0 0 0 0 0 0]<br>80/160 MHz DUP transmission allowed in A-PPDU | 3 |
| | | [0 0 0 0 0 0 1 1 0 0 0 0 0 0 0 0]<br>80/160 MHz DUP transmission allowed in A-PPDU | 4 |
| | | [0 0 0 0 0 0 0 0 1 1 0 0 0 0 0 0]<br>80/160 MHz DUP transmission allowed in A-PPDU | 5 |
| | | [0 0 0 0 0 0 0 0 0 0 1 1 0 0 0 0]<br>80/160 MHz DUP transmission allowed in A-PPDU | 6 |
| | | [0 0 0 0 0 0 0 0 0 0 0 0 1 1 0 0]<br>80/160 MHz DUP transmission allowed in A-PPDU | 7 |
| | | [0 0 0 0 0 0 0 0 0 0 0 0 0 0 1 1]<br>80/160 MHz DUP transmission allowed in A-PPDU | 8 |
| | 80 MHz puncturing | [1 1 1 1 0 0 0 0 0 0 0 0 0 0 0 0]<br>80/160 MHz DUP transmission allowed in A-PPDU | 9 |
| | | [0 0 0 0 1 1 1 1 0 0 0 0 0 0 0 0]<br>80/160 MHz DUP transmission allowed in A-PPDU | 10 |
| | | [0 0 0 0 0 0 0 0 1 1 1 1 0 0 0 0]<br>80/160 MHz DUP transmission allowed in A-PPDU | 11 |
| | | [0 0 0 0 0 0 0 0 0 0 0 0 1 1 1 1]<br>80/160 MHz DUP transmission allowed in A-PPDU | 12 |
| | 320-80-40 | [1 1 1 1 1 1 0 0 0 0 0 0 0 0 0 0]<br>80/160M Hz DUP transmission allowed | 13 |
| | | [1 1 1 1 0 0 1 1 0 0 0 0 0 0 0 0]<br>80/160 MHz DUP transmission allowed | 14 |
| | | [1 1 1 1 0 0 0 0 1 1 0 0 0 0 0 0]<br>80 MHz DUP transmission allowed in A-PPDU | 15 |
| | | [1 1 1 1 0 0 0 0 0 0 1 1 0 0 0 0]<br>80 MHz DUP transmission allowed in A-PPDU | 16 |
| | | [1 1 1 1 0 0 0 0 0 0 0 0 1 1 0 0]<br>80 MHz DUP transmission allowed in A-PPDU | 17 |
| | | [1 1 1 1 0 0 0 0 0 0 0 0 0 0 1 1]<br>80 MHz DUP transmission allowed in A-PPDU | 18 |
| | | [1 1 0 0 0 0 0 0 0 0 0 0 1 1 1 1]<br>80 MHz DUP transmission allowed in A-PPDU | 19 |
| | | [0 0 1 1 0 0 0 0 0 0 0 0 1 1 1 1]<br>80 MHz DUP transmission allowed in A-PPDU | 20 |
| | | [0 0 0 0 1 1 0 0 0 0 0 0 1 1 1 1]<br>80 MHz DUP transmission allowed in A-PPDU | 21 |
| | | [0 0 0 0 0 0 1 1 0 0 0 0 1 1 1 1]<br>80 MHz DUP transmission allowed in A-PPDU | 22 |

TABLE 12-continued

| Operating channel width of the BSS | Cases | Puncturing pattern in Disabled Subchannel Bitmap field | Field value |
|---|---|---|---|
| | | [0 0 0 0 0 0 0 0 1 1 0 0 1 1 1 1] 80 MHz DUP transmission allowed in A-PPDU | 23 |
| | | [0 0 0 0 0 0 0 0 0 0 1 1 1 1 1 1] 80/160 MHz DUP transmission allowed in A-PPDU | 24 |

Figure 12:
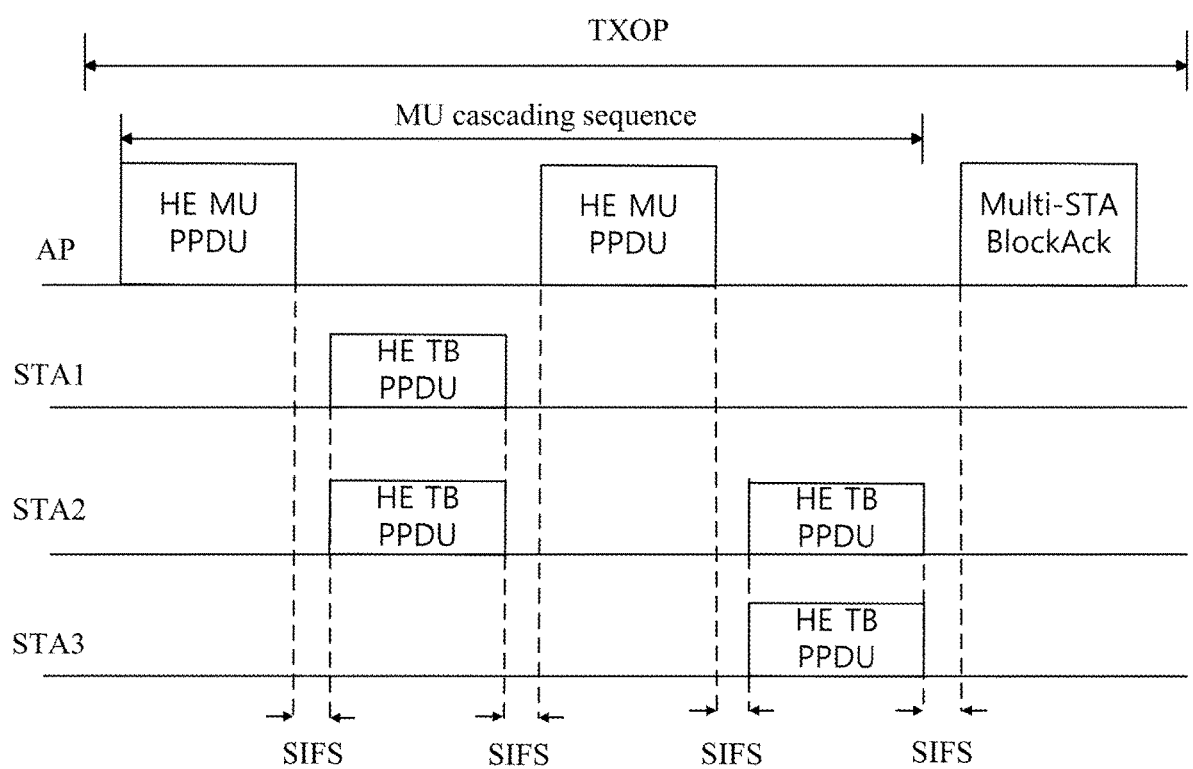
FIG. 12 illustrates an example of general cascaded operation in flax according to an embodiment of the present disclosure.

FIG. 12 illustrates an example of general cascaded operation in flax according to an embodiment of the present disclosure.

Referring to FIG. 12, an MU cascading sequence is a frame exchange sequence between an AP and one or more STAs (e.g., STA1, STA2, STA3) in which the AP, within a single PPDU, acknowledges one or more frames from a STA, and triggers the STA for a further UL transmission.

The second HE MU PPDU in FIG. 12 includes an Ack or BlockAck (BA) frame and a triggering frame. An AP shall not transmit an A-MPDU to a STA that includes an Ack or BA frame together with a triggering frame unless both the AP and the STA have indicated support by setting the MU Cascading Support subfield to 1 in the MAC Capabilities Information field in the HE Capabilities element they transmit. In an MU cascading sequence, the receivers of an HE MU PPDU may differ from the transmitters of preceding HE TB PPDUs. An MU cascading sequence is sent within a single TXOP.

Figure 13:
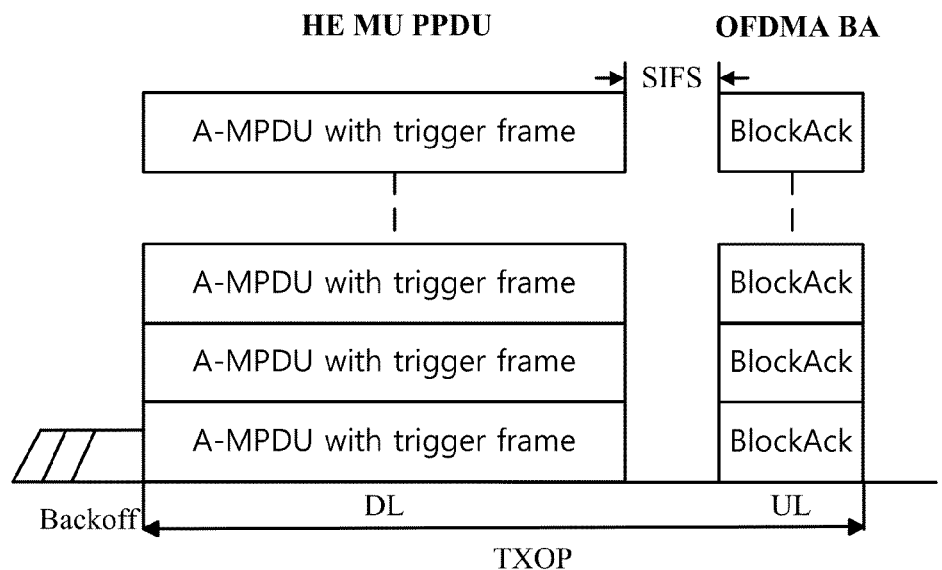
FIG. 13 illustrates an example of a difference between a cascaded operation including ACK/BA in UL and a cascaded operation including ACK/BA in UL for A-PPDU transmission according to an embodiment of the present disclosure.
Figure 13:
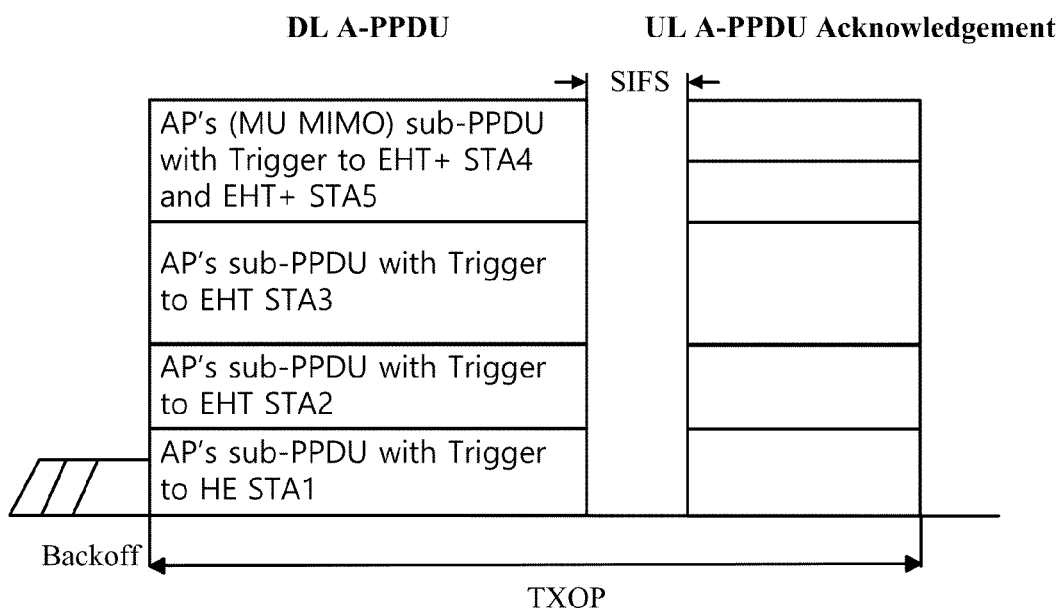

This present disclosure provides the method to allow the cascaded operation consisting of DL A-PPDU and UL A-PPDU transmission (e.g. within TXOP but not limited to the specific service period) as shown in FIG. 13 below. AP and STAs may exchange any types of frames efficiently and quickly. Considering A-PPDU consisting of HE PPDU and EHT PPDU as sub-PPDUs, this cascaded operation is not limited to A-PPDU transmission. This operation is applicable to MU cascading sequence in EHT PPDU (EHT MU PPDU followed by EHT TB PPDU sequentially and repeatedly) as well.

FIG. 13 illustrates an example of difference between a cascaded operation including ACK/BA in UL and a cascaded operation including ACK/BA in UL for A-PPDU transmission according to an embodiment of the present disclosure. A (a) of FIG. 13 is an example of the cascaded operation including ACK/BA in UL and a (b) of FIG. 13 is an example of the cascaded operation including ACK/BA in UL for A-PPDU transmission.

Referring to (a) of FIG. 13, a STA (e.g. HE STA) that is the recipient, within an HE MU PPDU, of a Trigger frame, or of a frame that solicits Acknowledgment, shall send the immediate response according to the scheduling information that is carried either in the Trigger frame(s) or TRS Control subfield. If the Trigger frame or the frame carrying the TRS Control subfield is not received, then the STA shall not respond.

Referring to (b) of FIG. 13, a STA (e.g. HE STA or EHT STA) that is the recipient, within a corresponding sub-PPDU, of a Trigger frame, or of a frame that solicits Acknowledgment, shall send the immediate response according to the scheduling information that is carried either in the Trigger frame(s) or Control subfield in the frame. If the Trigger frame or the frame carrying the Control subfield is not received, then the STA shall not respond. For example, the HE STA1 that is the recipient, within the first sub-PPDU (e.g., HE PPDU), of a Trigger frame, or of a frame that solicits Acknowledgment, shall send the immediate response according to the scheduling information that is carried either in the Trigger frame(s) or Control subfield for HE PPDU (e.g., TRS Control subfield). For example, the EHT STA2 that is the recipient, within the second sub-PPDU (e.g., EHT PPDU), of a Trigger frame, or of a frame that solicits Acknowledgment, shall send the immediate response according to the scheduling information that is carried either in the Trigger frame(s) or Control subfield for EHT PPDU.

In general, if Acknowledgement frames from multiple STAs need to be responded to the received DL frame, Acknowledgement as an immediate response can reduce overhead. Given Acknowledgement frame multiplexed with UL manner, some scheduling information should be considered. DL frame including UL scheduling information could work like the simplified trigger information while saving overhead. For example, corresponding scheduling information to solicit responding UL PPDU (e.g. TB PPDUs) could be transmitted in MAC portion. For example, it could be one of the Control subfield in A-Control subfield carried in MAC portion. To be specific, a TRS (triggered response scheduling) Control subfield could be used to trigger Acknowledgement frames in UL wherein Acknowledgement frames from multiple STAs could be an immediate response (e.g, with SIFS).

Especially for TRS Control subfield, since the TRS Control subfield has been carried in HE PPDU, its usage should be applied to being carried in EHT PPDU supporting advanced features such as 320 MHz bandwidth, multiple RUs, or Nss>8. Moreover, new type of TRS control subfield for EHT PPDU could be also used for A-PPDU MU cascaded operation.

The HT Control field has different variants: the HT variant, the VHT variant, the HE variant, and EHT variant. In HE variant and EHT variant, the format of the A-Control subfield is shown in FIG. 14.

Figure 14:
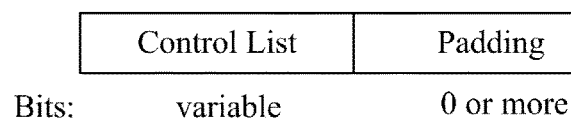
FIG. 14 illustrates an example of the A-Control subfield format and the Control subfield format according to an embodiment of the present disclosure.
Figure 14:
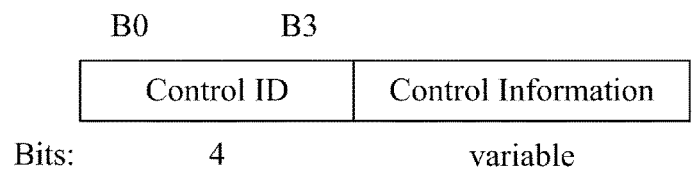

FIG. 14 illustrates an example of the A-Control subfield format and the Control subfield format according to an embodiment of the present disclosure.

Referring to FIG. 14, the A-Control subfield includes Control List subfield and, if present, Padding subfield. The A-Control subfield is 30 bits in length. The Control List subfield includes one or more Control subfields. Each Control subfield includes Control ID subfield and Control Information subfield. The Control ID subfield indicates the type of information carried in the Control Information subfield.

The length of the Control Information subfield is fixed for each value of the Control ID subfield that is not reserved. The values of the Control ID subfield and the associated length of the Control Information subfield are defined depending on the information carried in the Control Information subfield. For example, the values of the Control ID subfield and the associated length of the Control Information subfield for flax are defined in Table 13.

TABLE 13

| Control ID value | Meaning | Length of the Control Information subfield (bits) | Content of the Control Information subfield |
| --- | --- | --- | --- |
| 0 | Triggered response scheduling (TRS) | 26 | TRS Control |
| 1 | Operating mode (OM) | 12 | OM Control |
| 2 | HE link adaptation (HLA) | 26 | HLA Control |
| 3 | Buffer status report (BSR) | 26 | BSR Control |
| 4 | UL power headroom (UPH) | 8 | UPH Control |
| 5 | Bandwidth query report (BQR) | 10 | BQR Control |
| 6 | Command and status (CAS) | 8 | CAS Control |
| 7-14 | Reserved | | |
| 15 | Ones need expansion surely (ONES) | 26 | Set to all 1 s |

Referring to Table 13, when the value of the Control ID subfield is set to 0, the Control Information subfield defined in flax is a TRS Control subfield including TRS information for soliciting an HE TB PPDU. The format of the TRS Control subfield defined in flax is shown in FIG. 15.

Figure 15:
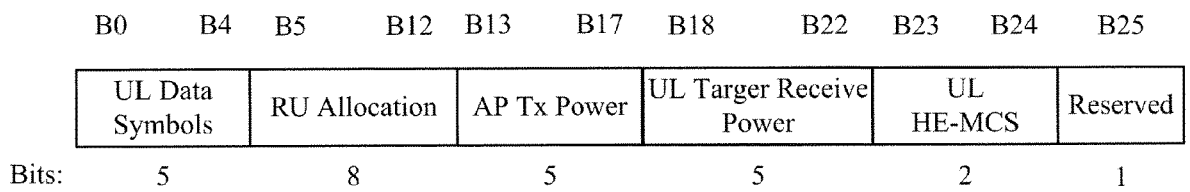
FIG. 15 illustrates an example of the TRS Control subfield format defined in 11ax according to an embodiment of the present disclosure.

FIG. 15 illustrates an example of the TRS Control subfield format defined in 11ax according to an embodiment of the present disclosure.

Referring to FIG. 15, the TRS Control subfield in 11ax includes UL Data Symbols subfield, RU Allocation Subfield, AP Tx Power subfield, UL Target Received Power subfield, UL HE-MCS subfield and Reserved subfield. The UL Data Symbols subfield indicates the number of OFDM symbols in the Data field of the HE TB PPDU response and is set to the number of OFDM symbols minus 1. The RU Allocation subfield indicates the RU assigned for transmitting the HE TB PPDU response. The AP Tx Power subfield indicates the AP's combined transmit power at the transmit antenna connector of all the antennas used to transmit the triggering PPDU in units of dBm/20 MHz. The UL Target Receive Power subfield indicates the expected receive signal power, measured at the AP's antenna connector and averaged over the antennas. The UL HE-MCS subfield indicates the HE-MCS, in the range HE-MCS 0 to 3.

To allow the cascaded operation in A-PPDU transmission for HE PPDU and EHT PPDU, there are some embodiments to define a format of a TRS Control subfield for EHT PPDU.

an embodiment of the present disclosure is that the same TRS Control subfield (e.g., the TRS Control subfield in flax) with Control ID setting to 0 could be carried in both HE PPDU and EHT PPDU. The same features could be allowed for HE STAs and EHT STAs. With the same MCS levels in UL HE MCS and UL EHT MCS, there is no problem to get the correct MCS values.

An embodiment of the present disclosure is that while TRS Control subfield in 11ax could be carried in HE PPDU, a different TRS Control subfield including additional information could be carried in EHT PPDU. The different TRS Control subfield could have the same Control ID (e.g., 0) or different Control ID depending on how to distinguish between HE PPDU and EHT PPDU.

Embodiment 1

This embodiment is to reuse the format of the TRS control subfield in 11ax with the same Control ID value such as 0 for EHT PPDU. When this TRS control subfield is included in EHT PPDU, its interpretation of some subfields in FIG. 15 could be different. Its PPDU type could be distinguished by either detecting or decoding the preamble portion between HE and EHT. For example, UL HE-MCS subfield could be reinterpreted as UL EHT-MCS. UL EHT-MCS could include a value of EHT-MCS (e.g., 15) to indicate DCM. UL EHT-MCS could include a value of EHT-MCS (e.g., 14) to indicate DUP mode. For example, Reserved subfield could be used to indicate resource units newly defined for 11be. It could be named as PS160 subfield to match the PS160 subfield in an EHT variant User info field in Trigger frame which is jointly encoded with RU Allocation subfield in the EHT variant User Info field in Trigger frame. The resource unit's positions defined in RU Allocation in this TRS control subfield is the same as in RU Allocation subfield defined in an EHT variant User Info field in a Trigger frame. B0 of the RU Allocation subfield is set to 0 to indicate that the RU or MRU allocation applies to the primary 80 MHz channel and set to 1 to indicate that the RU allocation applies to the secondary 80 MHz channel in the primary 160 MHz channel. B0 of the RU Allocation subfield is set to 0 to indicate that the RU or MRU allocation applies to the lower 80 MHz in the secondary 160 MHz and is set to 1 to indicate that the RU allocation applies to upper 80 MHz in the secondary 160 MHz channel. In addition to those subfields, it could include UL Data symbols, AP Tx Power, or UL Target Receive Power.

As for the Trigger frame, along with the UL BW subfield in the Common Info field, the UL BW Extension subfield to indicate up to 320 MHz, and the PS160 subfield in the EHT variant User Info field, it identifies the size and the location of the RU/MRU. However, given the limited space in this TRS control subfield, default settings for some UL scheduling control information should be considered. For example, there is no spare bit to indicate 320 MHz bandwidth such as UL BW Extension subfield in Trigger frame. To indicate BW information for responding EHT PPDU, the CH_BANDWITDTH parameter is set to the value of the RXVECTOR parameter CH_BANDWIDTH of the soliciting DL EHT PPDU. Depending on the PPDU type, the permissible values for CH_BANDWIDTH could be different.

The permissible values for CH_BANDWIDTH parameter are CBW80, CBW160, CBW320-1, and CBW320-2 if the triggering PPDU is an EHT MU PPDU with DUP mode.

Otherwise, the permissible values for CH_BANDWIDTH are CBW20, CBW40, CBW80, CBW160, CBW320-1, and CBW320-2 if the triggering PPDU is an EHT MU PPDU.

A non-AP STA transmitting an EHT TB PPDU in response to a frame including the TRS Control subfield sets the TXVECTOR parameters as follows:
  The FORMAT parameter is set to EHT_TB.
  The TRIGGER_METHOD parameter is set to TRS.
  The L_LENGTH parameter is computed as using the TXTIME value.
  The BSS_COLOR parameters is set to the values of the RXVECTOR parameters BSS_COLOR of the soliciting DL EHT PPDU.
  The NUM_EHT_LTF parameter is set to 1.
  The STARTING_STS_NUM parameter is set to 0.
  The FEC_CODING parameter is set to BCC_CODING if the RU Allocation subfield indicates an RU that is smaller than a 484-tone RU; otherwise, it is set to LDPC_CODING.
  The LDPC_EXTRA_SYMBOL parameter is set to 0 if the RU Allocation subfield indicates less than a 484-tone RU; otherwise, it is set to 1.
  The SPATIAL_REUSE parameter is set to PSR_AND_NON_SRG_OBSS_PD_PROHIBITED.
  The DEFAULT_PE_DURATION parameter is set to the default PE duration value for UL MU response scheduling, which is indicated by the AP in the Default PE Duration subfield of the EHT Operation element it transmits.
  If the RXVECTOR parameters EHT_LTF_TYPE and GI_TYPE of EHT MU PPDU carrying the frame with the TRS Control subfield are either 4×EHT-LTF and 32 μs_GI, respectively, or 2×EHT-LTF and 16 μs GI, respectively, then the EHT_LTF_TYPE and GI_TYPE parameters are set to 4×EHT-LTF and 32 μs_GI, respectively. Otherwise, the EHT_LTF_TYPE and GI_TYPE parameters are set to 2×EHTLTF and 16 μs_GI, respectively.

Embodiment 2

This embodiment is to define a new value in the Control ID especially for DUP mode. Its Control ID value could be one of reserved values such as 9, 11-14. It could include the information corresponding to EHT-MCS indicating DUP mode such as MCS 14. Or without control information for MCS, using the value in the Control ID for DUP mode, its soliciting PPDU is modulated with MCS 14. This embodiment of new TRS Control subfield for EHT PPDU could include a RU allocation subfield (or Bandwidth subfield) indicating only the RUs for 80 MHz, 160 MHz, and 320 MHz in UL TB PPDU. In addition to those subfields, the new TRS Control subfield for EHT PPDU could include UL Data symbols, AP Tx Power, or UL Target Receive Power wherein AP Tx Power and UL Target Received Power could be differently (with lower values) defined because there are some power restrictions to be applied for DUP mode. This embodiment only could be carried on the specific band such as 6 GHz band.

A non-AP STA transmitting an EHT_TB PPDU in response to a frame including this new TRS Control subfield sets the TXVECTOR parameters as follows:
  The FORMAT parameter is set to EHT_TB.
  The TRIGGER_METHOD parameter is set to TRS.
  The L_LENGTH parameter is computed as using the TXTIME value.
  The BSS_COLOR parameters is set to the values of the RXVECTOR parameters BSS_COLOR of the soliciting DL EHT PPDU.
  The NUM_EHT_LTF parameter is set to 1.
  The STARTING_STS_NUM parameter is set to 0.
  The FEC_CODING parameter is set to BCC_CODING if the RU Allocation subfield indicates an RU that is smaller than a 484-tone RU; otherwise, it is set to LDPC_CODING.
  The LDPC_EXTRA_SYMBOL parameter is set to 0 if the RU Allocation subfield indicates less than a 484-tone RU; otherwise, it is set to 1.
  The SPATIAL_REUSE parameter is set to PSR_AND_NON_SRG_OBSS_PD_PROHIBITED.
  The DEFAULT_PE_DURATION parameter is set to the default PE duration value for UL MU response scheduling, which is indicated by the AP in the Default PE Duration subfield of the EHT Operation element it transmits.
  If the RXVECTOR parameters EHT_LTF_TYPE and GI_TYPE of EHT MU PPDU carrying the frame with the new TRS Control subfield are either 4×EHT-LTF and 32 μs GI, respectively, or 2×EHT-LTF and 16 μs GI, respectively, then the EHT_LTF_TYPE and GI_TYPE parameters are set to 4×EHT-LTF and 32 μs GI, respectively. Otherwise, the EHT_LTF_TYPE and GI_TYPE parameters are set to 2×EHTLTF and 16 μs_GI, respectively.

In addition to embodiments above, some restriction could be applied to the resource units defined in RU allocation subfield. When resource unit is assigned, its location is not out of operating bandwidth. For example, HE PPDU is assigned for the primary 80 MHz channel and its responding PPDU in UL is also located for the primary 80 MHz channel. For example, EHT PPDU is assigned for the secondary 80 MHz channel and its responding PPDU in UL is also located for the secondary 80 MHz channel.

In addition to embodiments above, some restriction could be applied to the resource units defined in RU allocation subfield. For example, since more advanced features could be supported in the limited space of the TRS Control subfield for EHT PPDU, the default RU position for UL EHT scheduling response PPDU could be set as the same RU position of the DL EHT PPDU including the TRS Control subfield for EHT PPDU in MAC portion. It can save at least 8 bits of RU Allocation subfield. To indicate RU information for responding EHT PPDU in UL, the RU_ALLOCATION parameter in TXVECTOR is set to the value of the RXVECTOR parameter RU_ALLOCATION of the soliciting DL EHT PPDU.

Figure 16:
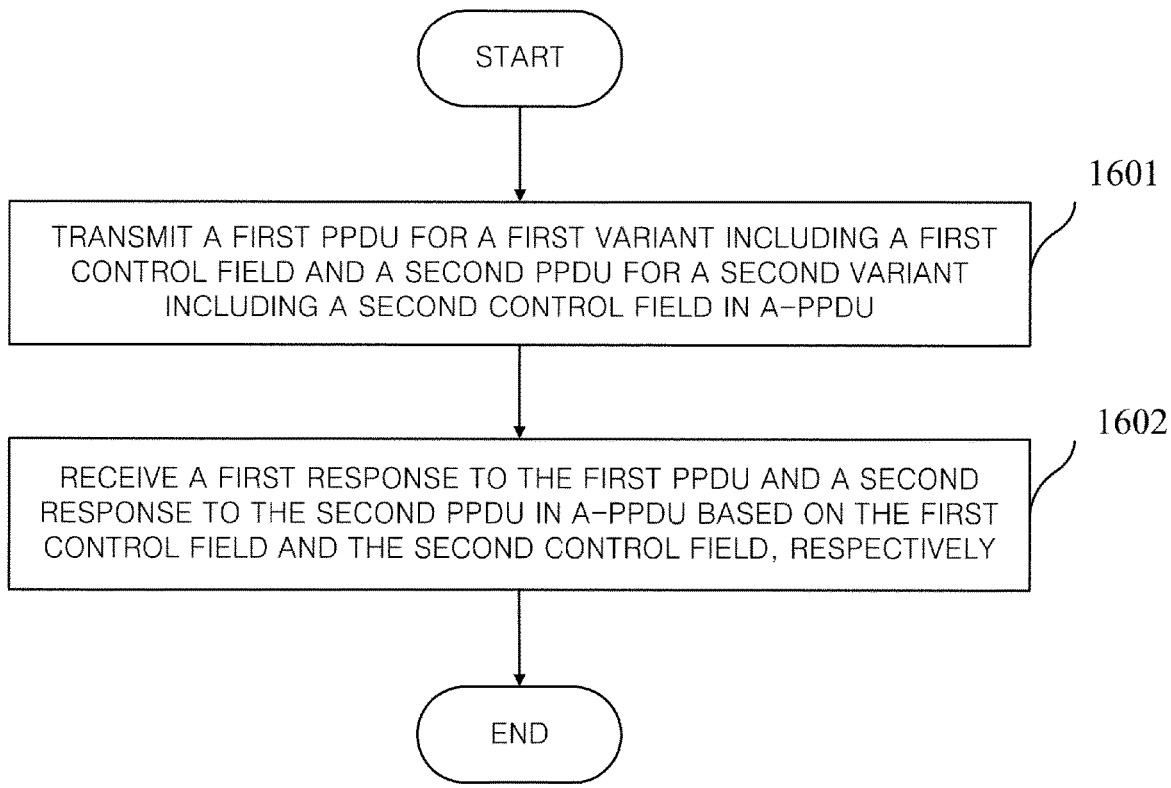
FIG. 16 illustrates a flowchart 1600 of a MU cascaded operation for A-PPDU transmission by a transmitter according to an embodiment of the present disclosure.

FIG. 16 illustrates a flowchart 1600 of a MU cascaded operation for A-PPDU transmission by a transmitter according to an embodiment of the present disclosure.

Referring to FIG. 16, in step 1601, a transmitter (e.g. a EHT AP) transmits a first PPDU for a first variant including a first control field and a second PPDU for a second variant including a second control field in A-PPDU. In some embodiments, the second PPDU for the second variant is transmitted in DUP mode. For example, the EHT AP transmits HE PPDU and EHT PPDU in A-PPDU, wherein the EHT PPDU is transmitted in DUP mode.

In step 1602, the transmitter receives a first response to the first PPDU and a second response to the second PPDU in A-PPDU based on the first control field and the second control field, respectively. In some embodiments, the first response to the first PPDU is based on the first control field and the second response to the second PPDU is based on second control field. For example, the HE STA and EHT STA transmit HE TB PPDU and EHT_TB PPDU in A-PPDU.

In some embodiments, the first variant is based on a first protocol standard and the second variant is based on a second protocol standard and the second protocol standard is beyond version of the first protocol standard. For example, the first protocol standard corresponds to 11ax (or HE) and the second protocol standard corresponds to 11be (or EHT).

In some embodiments, the first control field and the second control field are based on a same control field format. For example, the first control field and the second control filed is based on a TRS Control subfield format defined in 11ax.

In some embodiments, wherein the first control field and the second control field are based on a different control field format. For example, the first control field is based on a TRS Control subfield format defined in flax and the second control field is based on a new TRS Control subfield format defined in 11be.

In some embodiments, when the first control field and the second control field are based on a same control field format, at least one subfield of the second control field is reinterpreted in comparison to at least one corresponding subfield of the first control field based on difference between a preamble portion of the first PPDU and a preamble portion of the second PPDU to indicate specific information for the second variant which is not defined in the first variant. For example, the first control field and the second control field are based on a TRS Control subfield format. For example, a PPDU type could be distinguished by either detecting or decoding the preamble portion between HE and EHT. UL HE-MCS subfield in the TRS Control subfield could be reinterpreted as UL EHT-MCS. Reserved subfield in the TRS Control subfield could be used to indicate PS160 subfield newly defined for 11be.

In some embodiments, when the first control field and the second control field are based on a different control field format, the second control field includes at least one additional subfield with the first control field and the at least one additional subfield indicates specific information for the second variant which is not defined in the first variant.

In some embodiments, the first PPDU for the first variant and the first response are assigned in a same first channel and the second PPDU for the second variant and the second response are assigned in a same second channel. For example, HE PPDU is assigned for the primary 80 MHz channel and its responding PPDU in UL is also located for the primary 80 MHz channel. For example, EHT PPDU is assigned for the secondary 80 MHz channel and its responding PPDU in UL is also located for the secondary 80 MHz channel.

In some embodiments, the first PPDU for the first variant is based on two types of PPDU format for the first variant. For example, the first PPDU is based on HE ER SU PPDU. Another example, the first PPDU is based on HE MU PPDU.

Figure 17:
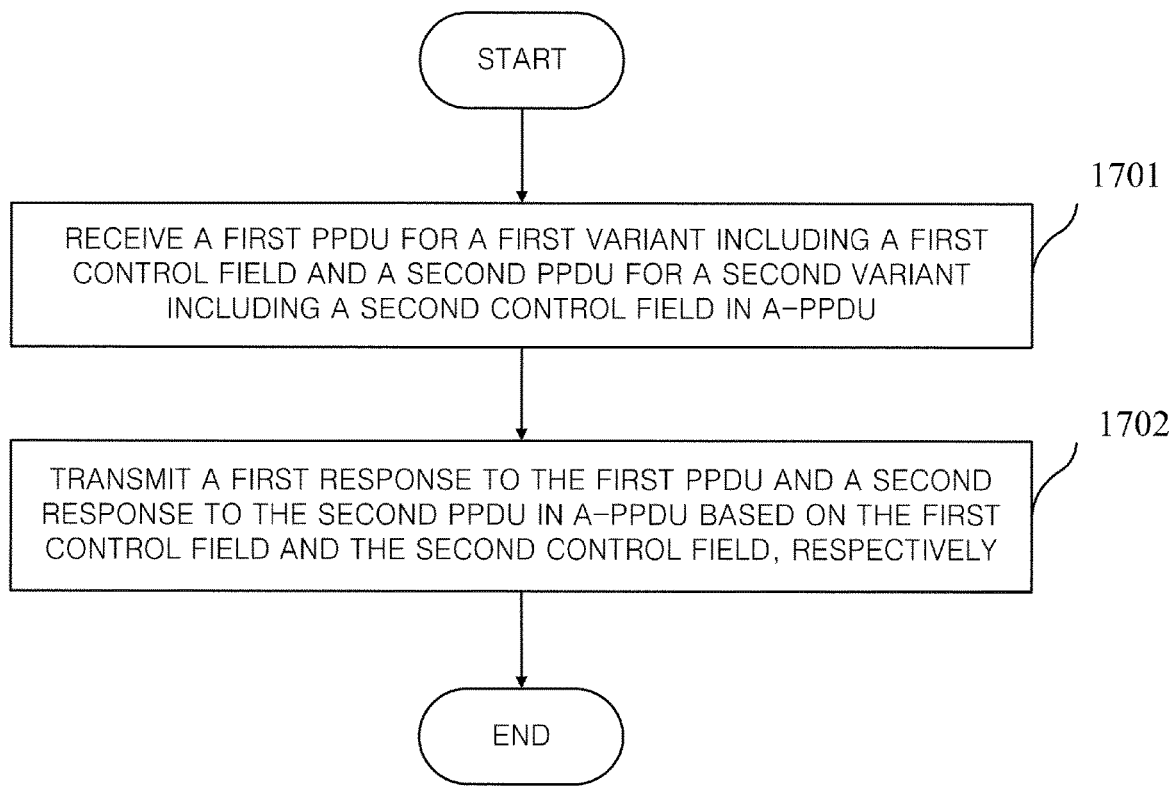
FIG. 17 illustrates a flowchart 1700 of a MU cascaded operation for A-PPDU transmission by a receiver according to an embodiment of the present disclosure.

FIG. 17 illustrates a flowchart 1700 of a MU cascaded operation for A-PPDU transmission by receiver according to an embodiment of the present disclosure.

Referring to FIG. 17, in step 1701, a receiver (e.g. a HE STA or EHT STA) receives a first PPDU for a first variant including a first control field and a second PPDU for a second variant including a second control field in A-PPDU. In some embodiments, the second PPDU for the second variant is transmitted in DUP mode. For example, the HE STA and the EHT STA receive HE PPDU and EHT PPDU in A-PPDU, wherein the EHT PPDU is transmitted in DUP mode.

In step 1702, the receiver transmits a first response to the first PPDU and a second response to the second PPDU in A-PPDU based on the first control field and the second control field, respectively. In some embodiments, the first response to the first PPDU is based on the first control field and the second response to the second PPDU is based on the second control field. For example, the HE STA and EHT STA transmit HE TB PPDU and EHT_TB PPDU in A-PPDU.

In some embodiments, the first variant is based on a first protocol standard and the second variant is based on a second protocol standard and the second protocol standard is beyond version of the first protocol standard. For example, the first protocol standard corresponds to 11ax (or HE) and the second protocol standard corresponds to 11be (or EHT).

In some embodiments, the first control field and the second control field are based on a same control field format. For example, the first control field and the second control filed are based on a TRS Control subfield format defined in 11ax.

In some embodiments, wherein the first control field and the second control field are based on a different control field format. For example, the first control field is based on a TRS Control subfield format defined in flax and the second control field is based on a new TRS Control subfield format defined in 11be.

In some embodiments, when the first control field and the second control field are based on a same control field format, at least one subfield of the second control field is reinterpreted in comparison to at least one corresponding subfield of the first control field based on a difference between a preamble portion of the first PPDU and a preamble portion of the second PPDU to indicate specific information for the second variant which is not defined in the first variant. For example, the first control field and the second control field are based on a TRS Control subfield format. For example, a PPDU type could be distinguished by either detecting or decoding the preamble portion between HE and EHT. UL HE-MCS subfield in the TRS Control subfield could be reinterpreted as UL EHT-MCS. Reserved subfield in the TRS Control subfield could be used to indicate PS160 subfield newly defined for 11be.

In some embodiments, when the first control field and the second control field are based on a different control field format, the second control field includes at least one additional subfield with the first control field and the at least one additional subfield indicates specific information for the second variant which is not defined in the first variant.

In some embodiments, the first PPDU for the first variant and the first response are assigned in a same first channel and the second PPDU for the second variant and the second response are assigned in a same second channel. For example, HE PPDU is assigned for the primary 80 MHz channel and its responding PPDU in UL is also located for the primary 80 MHz channel. For example, EHT PPDU is assigned for the secondary 80 MHz channel and its responding PPDU in UL is also located for the secondary 80 MHz channel.

In some embodiments, the first PPDU for the first variant is based on two types of PPDU format for the first variant. For example, the first PPDU is based on HE ER SU PPDU. Another example, the first PPDU is based on HE MU PPDU.

Although embodiments of the present disclosure have been described, various changes and modifications may be suggested to one skilled in the art. It is intended that the present disclosure encompass such changes and modifications as falling within the scope of the appended claims. None of the description in this application should be read as implying that any particular element, step, or function is an essential element that must be included in the claims scope. The scope of patented subject matter is defined by the claims.

What is claimed is:

1. A method performed by an apparatus in a wireless local area network (WLAN), the method comprising:
    transmitting a first physical layer convergence protocol (PLCP) protocol data unit (PPDU) having a first variant format and including a first triggered response scheduling control field and a second PPDU having a second variant format and including a second triggered response scheduling control field at the same time in A(aggregated)-PPDU, wherein the second PPDU for the second variant is transmitted in duplicate (DUP) mode in which data in a payload portion of the second PPDU is duplicated in frequency; and
    receiving a first response to the first PPDU and a second response to the second PPDU in A-PPDU based on the first triggered response scheduling control field and the second triggered response scheduling control field, respectively,
    wherein the first variant is based on a first protocol standard and the second variant is based on a second protocol standard, and
    wherein the second protocol standard is beyond version of the first protocol standard.

2. The method of claim 1, wherein the first triggered response scheduling control field and the second triggered response scheduling control field are based on a same control field format.

3. The method of claim 1, wherein the first triggered response scheduling control field and the second triggered response scheduling control field are based on a different control field format.

4. The method of claim 2, wherein at least one subfield of the second triggered response scheduling control field is reinterpreted in comparison to at least one corresponding subfield of the first triggered response scheduling control field based on difference between a preamble portion of the first PPDU and a preamble portion of the second PPDU to indicate specific information for the second variant which is not defined in the first variant.

5. The method of claim 3, wherein the second triggered response scheduling control field includes at least one additional subfield with the first triggered response scheduling control field, wherein at least one additional subfield indicates specific information for the second variant which is not defined in the first variant.

6. The method of claim 1, wherein the first PPDU for the first variant and the first response are assigned in a same first channel, wherein the second PPDU for the second variant and the second response are assigned in a same second channel.

7. An apparatus in a wireless local area network (WLAN), the apparatus comprising:
    a transceiver; and
    a processor configured to:
        control the transceiver to transmit a first physical layer convergence protocol (PLCP) protocol data unit (PPDU) for a first variant including a first triggered response scheduling control field and a second PPDU for a second variant including a second triggered response scheduling control field at the same time in A(aggregated)-PPDU, wherein the second PPDU for the second variant is transmitted in duplicate (DUP) mode in which data in a payload portion of the second PPDU is duplicated in frequency; and
        control the transceiver to receive a first response to the first PPDU and a second response to the second PPDU in A-PPDU based on the first triggered response scheduling control field and the second triggered response scheduling control field, respectively,
    wherein the first variant is based on a first protocol standard and the second variant is based on a second protocol standard, and
    wherein the second protocol standard is beyond version of the first protocol standard.

8. The apparatus of claim 7, wherein the first triggered response scheduling control field and the second triggered response scheduling control field are based on a same control field format.

9. The apparatus of claim 7, wherein the first triggered response scheduling control field and the second triggered response scheduling control field are based on a different control field format.

10. The apparatus of claim 8, wherein at least one subfield of the second triggered response scheduling control field is reinterpreted in comparison to at least one corresponding subfield of the first triggered response scheduling control field based on difference between a preamble portion of the first PPDU and a preamble portion of the second PPDU to indicate specific information for the second variant which is not defined in the first variant.

11. The apparatus of claim 9, wherein the second triggered response scheduling control field includes at least one additional subfield with the first triggered response scheduling control field, wherein at least one additional subfield indicates specific information for the second variant which is not defined in the first variant.

12. The apparatus of claim 7, wherein the first PPDU for the first variant and the first response are assigned in a same first channel, wherein the second PPDU for the second variant and the second response are assigned in a same second channel.

13. An apparatus in a wireless local area network (WLAN), the apparatus comprising:
    a transceiver; and
    a processor configured to:
        control the transceiver to receive a first physical layer convergence protocol (PLCP) protocol data unit (PPDU) for a first variant including a first triggered response scheduling control field and a second PPDU for a second variant including a second triggered response scheduling control field at the same time in A(aggregated)-PPDU, wherein the second PPDU for the second variant is transmitted in duplicate (DUP) mode in which data in a payload portion of the second PPDU is duplicated in frequency; and
        control the transceiver to transmit a first response to the first PPDU and a second response to the second PPDU in A-PPDU based on the first triggered response scheduling control field and the second triggered response scheduling control field, respectively,
    wherein the first variant is based on a first protocol standard and the second variant is based on a second protocol standard, and
    wherein the second protocol standard is beyond version of the first protocol standard.

14. The apparatus of claim 13, wherein the first triggered response scheduling control field and the second triggered response scheduling control field are based on a same control field format.

15. The apparatus of claim 13, wherein the first triggered response scheduling control field and the second triggered response scheduling control field are based on a different field format.

16. The apparatus of claim 14, wherein at least one subfield of the second triggered response scheduling control field is reinterpreted in comparison to at least one corresponding subfield of the first triggered response scheduling control field based on difference between a preamble portion of the first PPDU and a preamble portion of the second PPDU to indicate specific information for the second variant which is not defined in the first variant.

17. The apparatus of claim 15, wherein the second triggered response scheduling control field includes at least one additional subfield with the first triggered response scheduling control field wherein at least one additional subfield indicates specific information for the second variant which is not defined in the first variant.

18. The apparatus of claim 13, wherein the first PPDU for the first variant and the first response are assigned in a same first channel, wherein the second PPDU for the second variant and the second response are assigned in a same second channel.

* * * * *